Oct. 11, 1960 D. R. PIATT ET AL 2,955,710

COLLATOR

Filed Dec. 4, 1953 18 Sheets-Sheet 1

INVENTORS
DONALD R. PIATT
PAUL J. SCHLESSIGER
BY J. Jancin Jr.
ATTORNEY

Oct. 11, 1960 | D. R. PIATT ET AL | 2,955,710

COLLATOR

Filed Dec. 4, 1953 | 18 Sheets-Sheet 2

INVENTORS
DONALD R. PIATT
PAUL J. SCHLESSIGER
BY J. Jancin Jr.
ATTORNEY

INVENTORS
DONALD R. PIATT
PAUL J. SCHLESSIGER

BY J. Janein Jr.
ATTORNEY

INVENTORS
DONALD R. PIATT
PAUL J. SCHLESSIGER
BY J. Jancin Jr.
ATTORNEY

INVENTORS
DONALD R. PIATT
PAUL J. SCHLESSIGER
BY J. Jancin Jr.
ATTORNEY

Oct. 11, 1960 D. R. PIATT ET AL 2,955,710

COLLATOR

Filed Dec. 4, 1953 18 Sheets-Sheet 6

INVENTORS
DONALD R. PIATT
PAUL J. SCHLESSIGER
BY J. Jancin Jr.
ATTORNEY

INVENTORS
DONALD R. PIATT
PAUL J. SCHLESSIGER
BY J. Jancin Jr.
ATTORNEY

COLLATOR

Filed Dec. 4, 1953 18 Sheets-Sheet 8

INVENTORS
DONALD R. PIATT
PAUL J. SCHLESSIGER
BY J. Jancin Jr.
ATTORNEY

INVENTORS
DONALD R. PIATT
PAUL J. SCHLESSIGER
BY J. Tancin Jr.
ATTORNEY

Oct. 11, 1960 D. R. PIATT ET AL 2,955,710

COLLATOR

Filed Dec. 4, 1953 18 Sheets-Sheet 10

INVENTORS
DONALD R. PIATT
PAUL J. SCHLESSIGER
BY J. Janein Jr.
ATTORNEY

INVENTORS
DONALD R. PIATT
PAUL J. SCHLESSIGER
BY J. Jancin Jr.
ATTORNEY

INVENTORS
DONALD R. PIATT
PAUL J. SCHLESSIGER
BY
J. Jancin Jr.
ATTORNEY

COLLATOR

Filed Dec. 4, 1953 18 Sheets-Sheet 13

INVENTORS
DONALD R. PIATT
PAUL J. SCHLESSIGER
BY J. Jancin Jr.
ATTORNEY

INVENTORS
DONALD R. PIATT
PAUL J. SCHLESSIGER
BY
J. Jancin Jr.
ATTORNEY

INVENTORS
DONALD R. PIATT
PAUL J. SCHLESSIGER
BY J. Jancin Jr.
ATTORNEY

Oct. 11, 1960 D. R. PIATT ET AL 2,955,710
COLLATOR
Filed Dec. 4, 1953 18 Sheets-Sheet 16

INVENTORS
DONALD R. PIATT
PAUL J. SCHLESSIGER
BY
J. Jancin Jr.
ATTORNEY

INVENTORS
DONALD R. PIATT
PAUL J. SCHLESSIGER
BY
J. Jancin Jr.
ATTORNEY

INVENTORS
DONALD R. PIATT
PAUL J. SCHLESSIGER
BY J. Tancin Jr.
ATTORNEY 2,955,710
Patented Oct. 11, 1960

2,955,710

COLLATOR

Donald R. Piatt and Paul J. Schlessiger, Endicott, N.Y., assignors to International Business Machines Corporation, New York, N.Y., a corporation of New York Filed Dec. 4, 1953, Ser. No. 396,134

14 Claims. (Cl. 209—110)

This invention relates to record controlled data comparing machines in general, such as the well-known IBM card collating machine, and to the data control apparatus therefor in particular.

A record card distributing machine such as the aforementioned well-known IBM card collator has mechanism for effecting a comparison of data recorded on a plurality of cards and selectively disposing of the record cards to card receiving stations in accordance with the nature of the card selecting, associating and disassociating operations setup.

Alphabetic characters are normally designated in record cards by combinational pairs of marks in a column of the record card. Such marks are perforations in the present case and are located selectively in index positions of the columns of the card. The index positions 1 to 9 are known as the numeric positions, and the index positions R, X and O are known as the zone positions. The numbers 0 to 9 are designated by a single perforation in corresponding index positions of the columns, only one perforation being made in one column. Alphabetic characters are designated by a perforation in a zone position combined with a perforation in a numeric position. Hence, the numeric perforations may occur alone or in combination with zone perforations. Also, the zero perforation may occur alone or in combination with a numeric perforation. In addition, special characters are designated by one or more assigned perforations in a single card column. In brief, the perforations have an alternative codal significance depending upon whether they occur in combination or singly. Furthermore, a blank column also has a value significance since it may represent, for instance, a letter spacing function.

In view of the foregoing, it is necessary for the proper operation of a collator to make provision for the fact that a mark, or perforation, has one value in a scale when it occurs alone, and shares in defining a different value in the scale when it occurs in combination.

A principal object of the present invention resides in improved means for controlling the operation of a card collating machine, or the like, according to alphabetic, numeric or special character data recorded on the record cards.

In comparing data derived from denominationally designated card columns, it is required that the relation of the values in the higher denominations dominate the relation of values in the lower orders. Comparison circuits, each for a different denomination, are therefore connected in tandem to control comparison result means. However, if it is determined in any of the higher order circuits that one value is greater than the other, a signal is directed from this circuit to the result means, bypassing the succeeding circuits. It may be seen then that the number of comparison circuits through which the aforementioned signal may pass to the result means, is variable.

If it is desired to collate two batches of cards into one batch in which the cards are arranged in an ascending order, for example, the card bearing data which is low, or inferior, after a determination of the relative magnitude of the data recorded on two cards, is advanced to the card receiving station. Inasmuch as the data bearing record card whose relative magnitude is high, or superior, is not advanced to a card receiving station in a machine cycle during which the card is analyzed at a sensing station, and since it is necessary to compare the data recorded on this card with the data recorded on other cards during subsequent machine cycles, a data storing device is required as is explained in the description of the preferred embodiment of this invention.

Accordingly, another object of this invention resides in the provision of an improved data storing device whereby the readout of data is delayed for a predetermined time.

The preferred embodiment of the invention disclosed herein includes a data storing device having a data carrier upon which data is impressed for predetermined delay, and continuously operating means for clearing successive portions of the data carrier in order to prepare the storing device for the entry of new data. In order to store in a continuously clearing, cyclically operable data carrier, data recorded on a record card for any number of machine cycles, the data being read out of the storing device is recirculated to the storing device input.

Accordingly, another object of this invention resides in the provision of improved data storage recirculating means.

Another object of this invention is to provide improved means for connecting the output and the input of a data storing device in order to recirculate selected data for additional delay.

Another object of this invention is to provide a delay apparatus to recirculate for additional delay, data being cleared from the apparatus.

In line with the foregoing, a more specific object of this invention is to provide a cyclically operable data storing device wherein data erased each cycle is recirculated for additional storage delay prior to being erased.

Another object of this invention is to provide an improved data storing device wherein selectively controlled switching means directs new data into the storing device for storage or directs stored data into the storing device for additional delay.

Other objects of the invention will be pointed out in the following description and claims and illustrated in the accompanying drawings, which disclose, by way of example, the principle of the invention and the best mode which has been contemplated, of applying that principle.

Figs. 15*a* to 15*f*, inclusive, form a wiring diagram for the card collating machine.

Figs. 16*a* to 16*k*, inclusive, are schematic card feeding diagrams showing the step-by-step advancement of primary and secondary cards to the card receiving stations.

Figure 17:
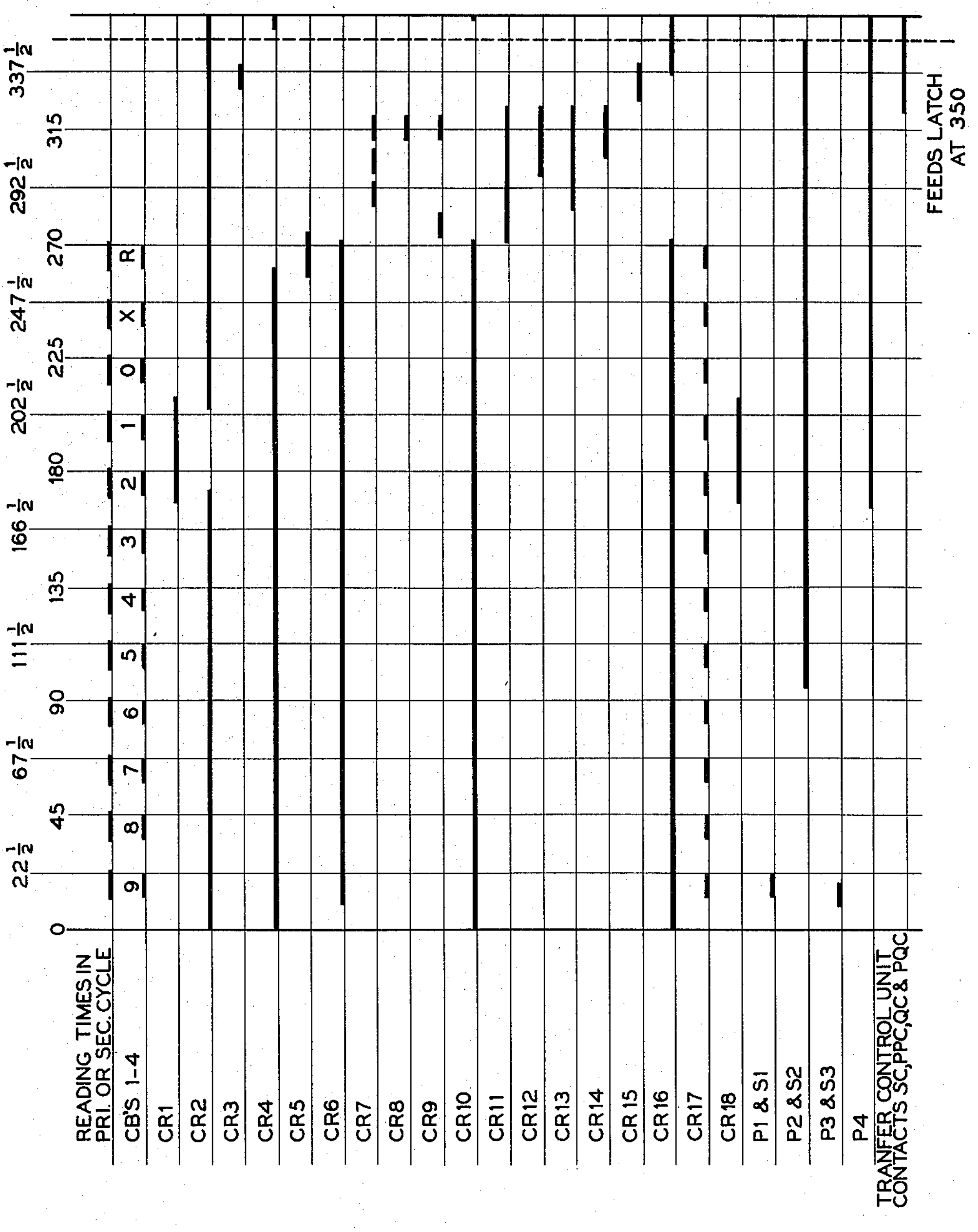

Fig. 17 is an electrical timing chart.

CODE CONFIGURATION

The index positions O, X and R are termed the zone positions, and the index positions 1 to 9 are called the numeric positions. It is important to observe (Fig. 8) that a perforation in the O position when unaccompanied by another perforation in the same column is representative of the cipher, but when accompanied by a perforation in one of the positions 2 to 9 is part of a letter representation. Also, the X hole, alone, represents a dash, but together with a numeric hole it is representative of a letter. In other words, the zone holes as well as the numeric holes vary in significance depending on whether they occur singly or in combination.

Figure 8:
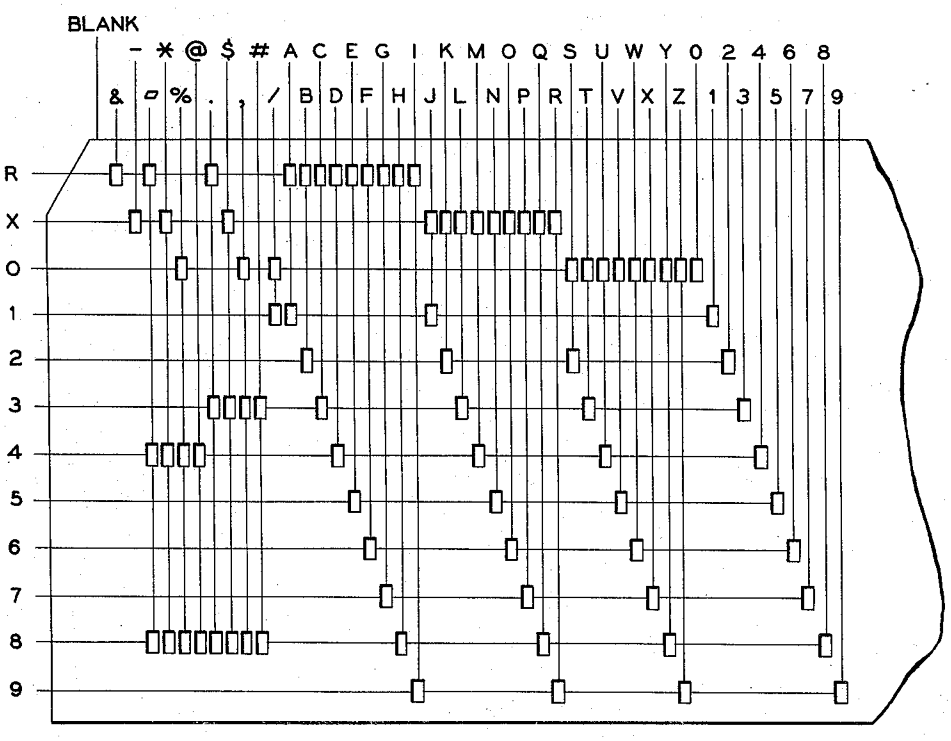
Fig. 8 is a large scale front elevation of a record card showing the code configuration.

The cards are of a common type used in tabulating machines and related apparatus. As is shown in Fig. 8, a card may be punched with alphabetic, numeric or special symbol data in the particular combinational code employed here. As is shown, a card column has twelve index or perforation positions; namely 9, 8, 7 . . . 1, O, X and R. A single perforation in a column in zone position R, for example, designates the "&" symbol. Other special symbols are represented by combinational perforations in a single column, such as R–8–3, for example. A single perforation in a column in one of the positions 0 to 9 represents the corresponding number 0 to 9. A perforation in position R combined with a perforation in one of the numeric positions 1 to 9 represents one of the letters A to I, whereas an X hole combined with one of the perforations in positions 1 to 9 represents one of the letters J to R, and a O hole combined with a perforation in one of the positions 2 to 9 represents one of the letters S to Z.

All of the symbols have a prescribed order of magnitude within a chosen scale of values. The ascending order of magnitude as selected for this disclosure is as follows:

(1) Blank column.

(2) Special symbols in the order R, X, R–8–3, R–8–4, X–8–3, X–8–4, O–8–3, O–8–4, 8–3, 8–4 and 0–1.

(3) Letters A to Z.

(4) Numerals 0 to 9.

An example of cards collated by the present machine in proper order is given below:

| | |
|---|---|
| AAF62843 | EX381417 |
| AAF628432 | 100$D3–17500 |
| AAG17954 | 1001D5–680 |
| EX38141–13 | 1035D3 |

CARD FEED MECHANISM

Figure 1:
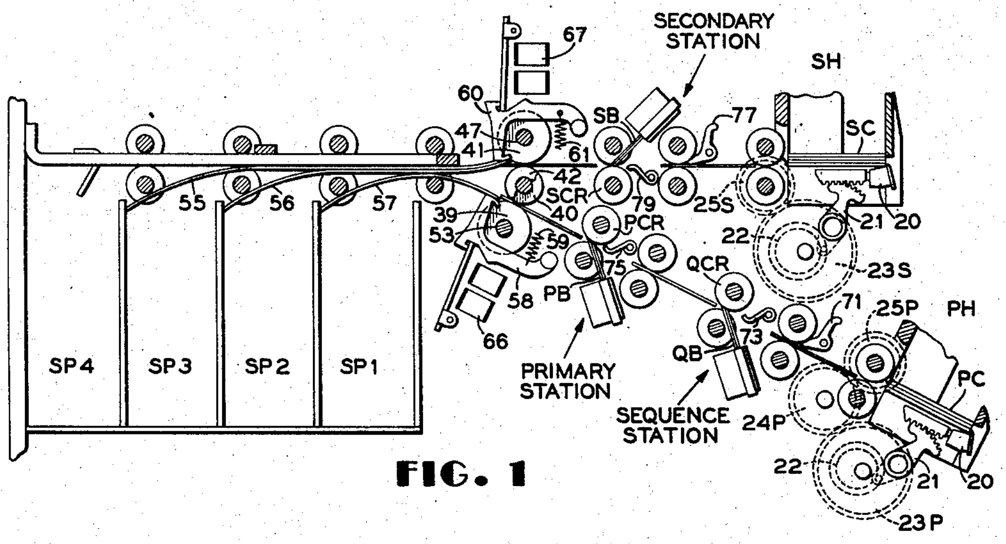
Fig. 1 is a somewhat diagrammatic view of a record card collating machine for handling two batches of cards.
Figure 2:
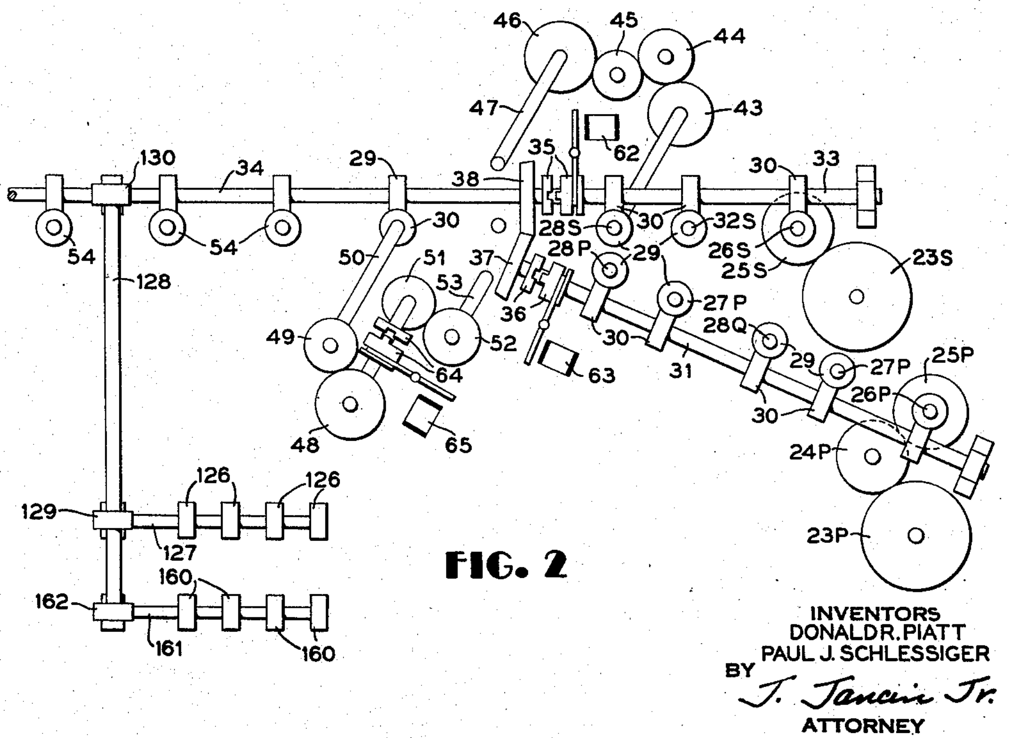
Fig. 2 is a somewhat diagrammatic view of the drive mechanism for a card collating machine of the aforementioned type.

Figs. 1 and 2 diagrammatically show the mechanical structure of the machine. Cards placed in primary hopper PH are designated PC and called primary cards. Cards in secondary hopper SH are designated SC and referred to as secondary cards. Pickers 20 are adapted to feed cards out of the hoppers. The pickers have rack teeth meshed with gear segments 21 which are oscillated by box cams 22 rigid with gears 23P and 23S. Gear 23P, in the primary side, is driven through an idler gear 24P by a gear 25P on a shaft 26P on a shaft 26P. Gear 23S, in the secondary side, is driven directly by a gear 25S on a shaft 26S. Shaft 26P and two similar shafts 27P in the primary side are feed roller shafts. These shafts and two contact roll shafts 28Q and 28P in the primary side are driven through spiral gear pairs 29 and 30 by the primary shaft 31. Shafts 26S and 32S in the secondary side are feed roll shafts, and these and a contact roll shaft 28S in the secondary side are driven by similar spiral gear pairs 29 and 30 from the secondary shaft 33. Shaft 33 may be clutched to continuously rotating main shaft 34 by a one-revolution clutch 35 brought into action by clutch magnet 62. Similarly, primary shaft 31 is clutchable by a one-revolution clutch 36 to a bevel gear 37, upon energization of clutch magnet 63. Bevel gear 37 is meshed with a bevel gear 38 on main shaft 34. Contact roll shaft 28Q, in the primary side, carries contact roll QCR coacting with reading brushes QB to read primary cards passing through the sequence station. The contact roll shaft 28P, in the primary side, carries contact roll PCR coacting with reading brushes PB to read primary cards traversing the primary station. The shaft 28S, in the secondary side, carries a contact roll SCR to coact with brushes SB to read secondary cards as they traverse the secondary station.

With primary shaft 31 in operation, the related picker 20 will feed a card from the hopper PH. The card will be fed further by the feed rollers in the primary side to eject rolls 39 and 40. With secondary shaft 33 in operation, a card will be fed from the hopper SH by the related picker 20 and thence by the feed rollers to the eject rolls 41 and 42. The eject rolls 41 and 42 are driven by the secondary shaft 33 through a train of gears 43, 44, 45, and 46, of which gear 43 is secured to secondary contact roll shaft 28S and gear 46 to shaft 47 of eject roll 41. The primary eject rolls 39 and 40 are driven by the main shaft 34 through means including a one-revolution clutch 64 which is effective upon energization of eject clutch magnet 65. The driver element of the clutch carries a gear 48 meshed with a gear 49 on a shaft 50 which is driven through a spiral gear pair 29 and 30 by the main shaft 34. The driven element of the clutch carries a gear 51 meshed with a gear 52 on shaft 53 of eject roll 39.

Shaft 50 and three more similarly driven shafts 54, carry feed rollers for coacting with feed rollers on companion shafts to feed the cards issuing from the eject rolls to a selected card stacker pocket. There are four pockets to which the cards may be selectively distributed. The pockets are designated SP1, SP2, SP3 and SP4. There are three guide blades 55, 56 and 57 for directing cards to selected pockets. Blade 57 rests at the rear upon the toe of a lever 58 associated with a magnet 66. With this magnet inactive, cards issuing from primary eject rolls 39 and 40 pass over the blade 57 into pocket SP2. Upon energization of magnet 66, it unhooks the related lever 58 allowing it to be moved upwardly by a spring 59 and thereby to lift the rear end of blade 57. A card issuing from eject rolls 39 and 40 will then pass under blade 57 into pocket SP1. As disclosed in U.S. Patent No. 2,379,828, the rear ends of blades 55 and 56 are transversely spaced apart. The rear end of top blade 55 extends under the toe of a lever 60 associated with a magnet 67, while the rear end of blade 56 extends under the toe of a similar lever (not shown) associated with a similar magnet 68 (shown only in the circuit diagram, Fig. 15*e*). With both magnets 67 and 68 deenergized, cards issuing from eject rolls 41 and 42 feed under blade 56 into pocket SP2. With magnet 68 energized, blade 56 is depressed at the rear end to allow cards issuing from eject rolls 41 and 42 to pass over this blade and under blade 55 into the pocket SP3. When magnet 67 is energized, it unhooks the lever 60 associated therewith and also the similar lever (not shown) associated with magnet 68, allowing attached springs 61 to rock these levers counterclockwise. Consequently, blades 55 and 56 are both depressed, and a card issuing from eject rolls 41 and 42 will pass over both blades into the pocket SP4.

Figure 15A:
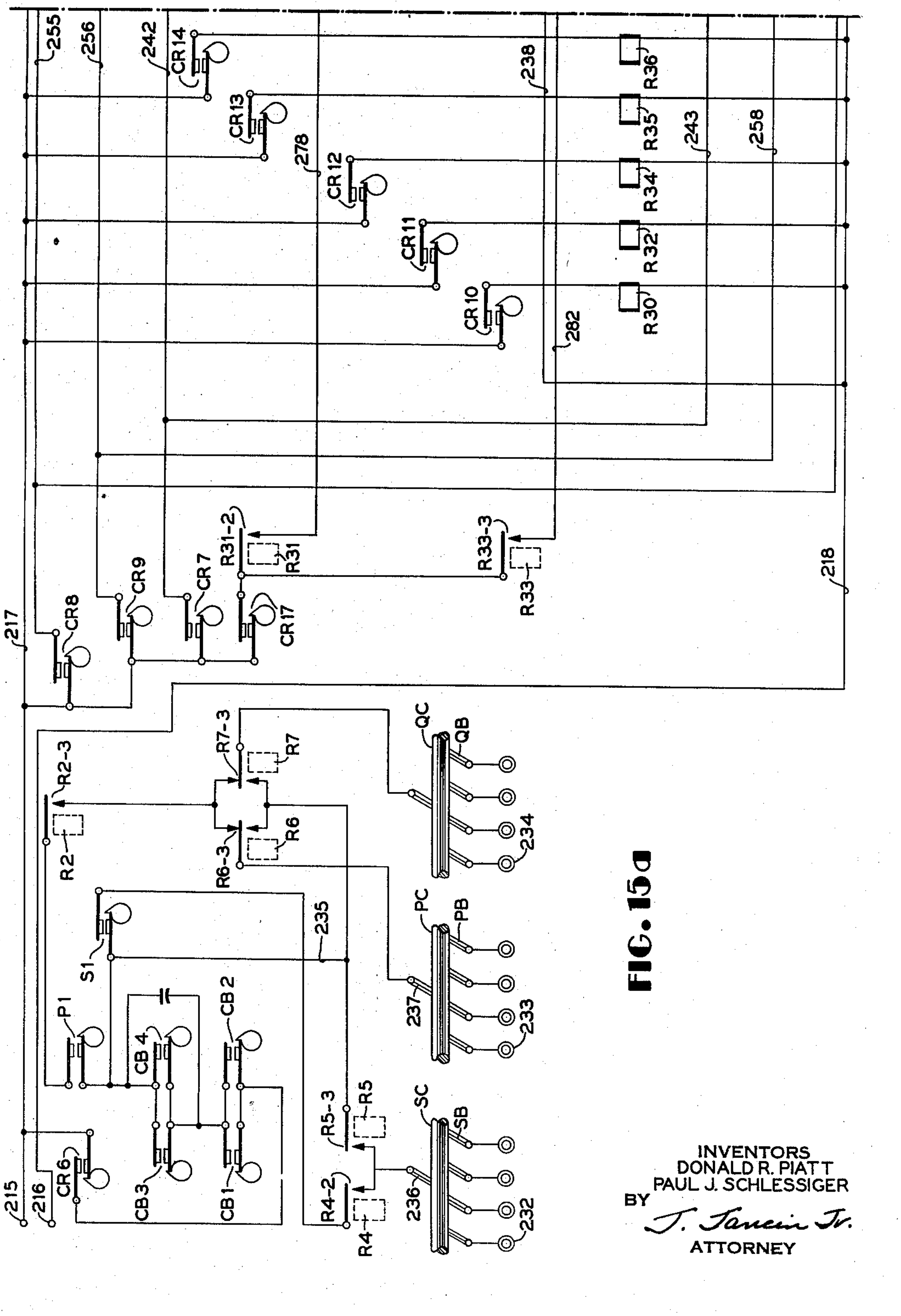
Figure 15D:
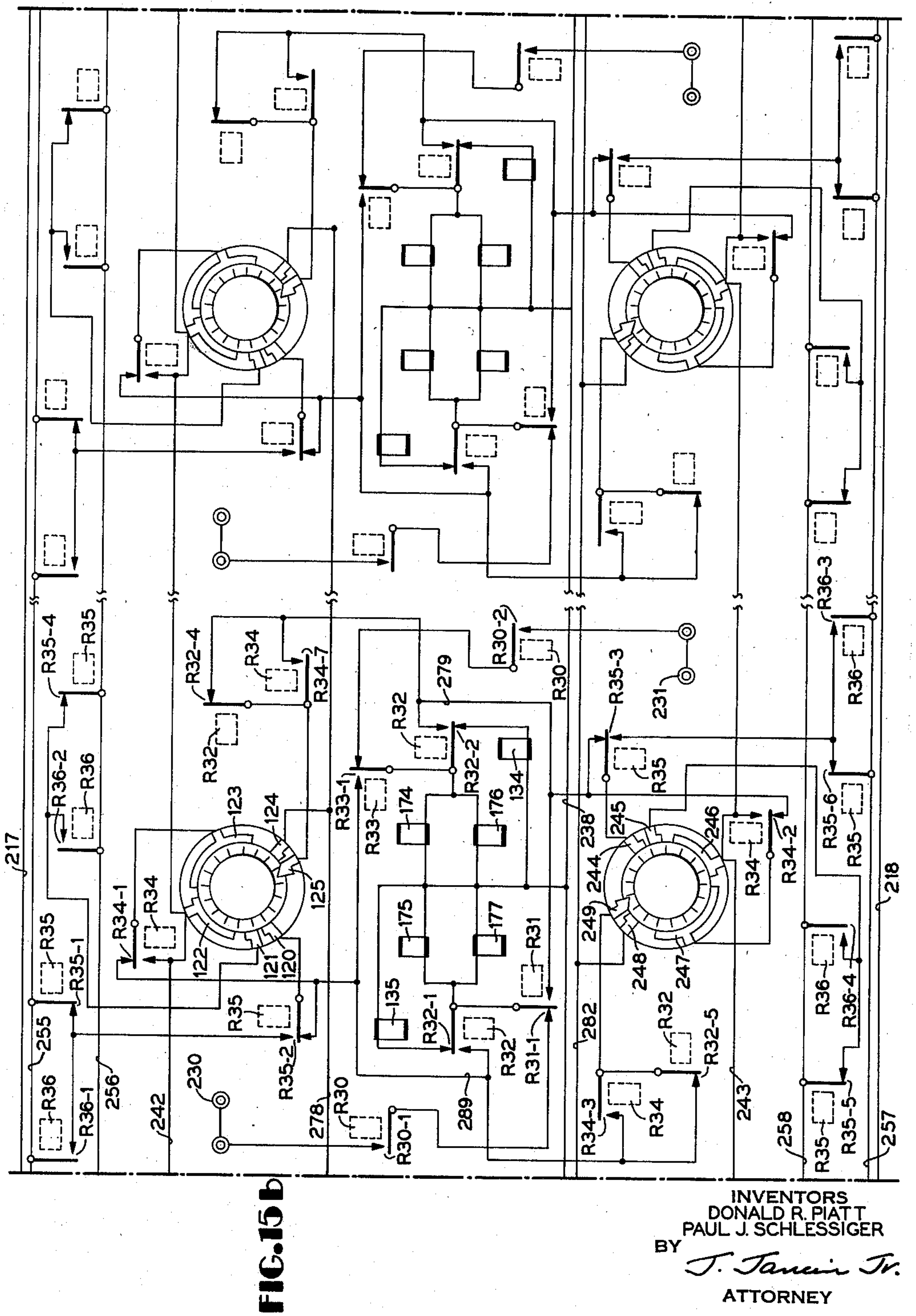
Figure 15C:
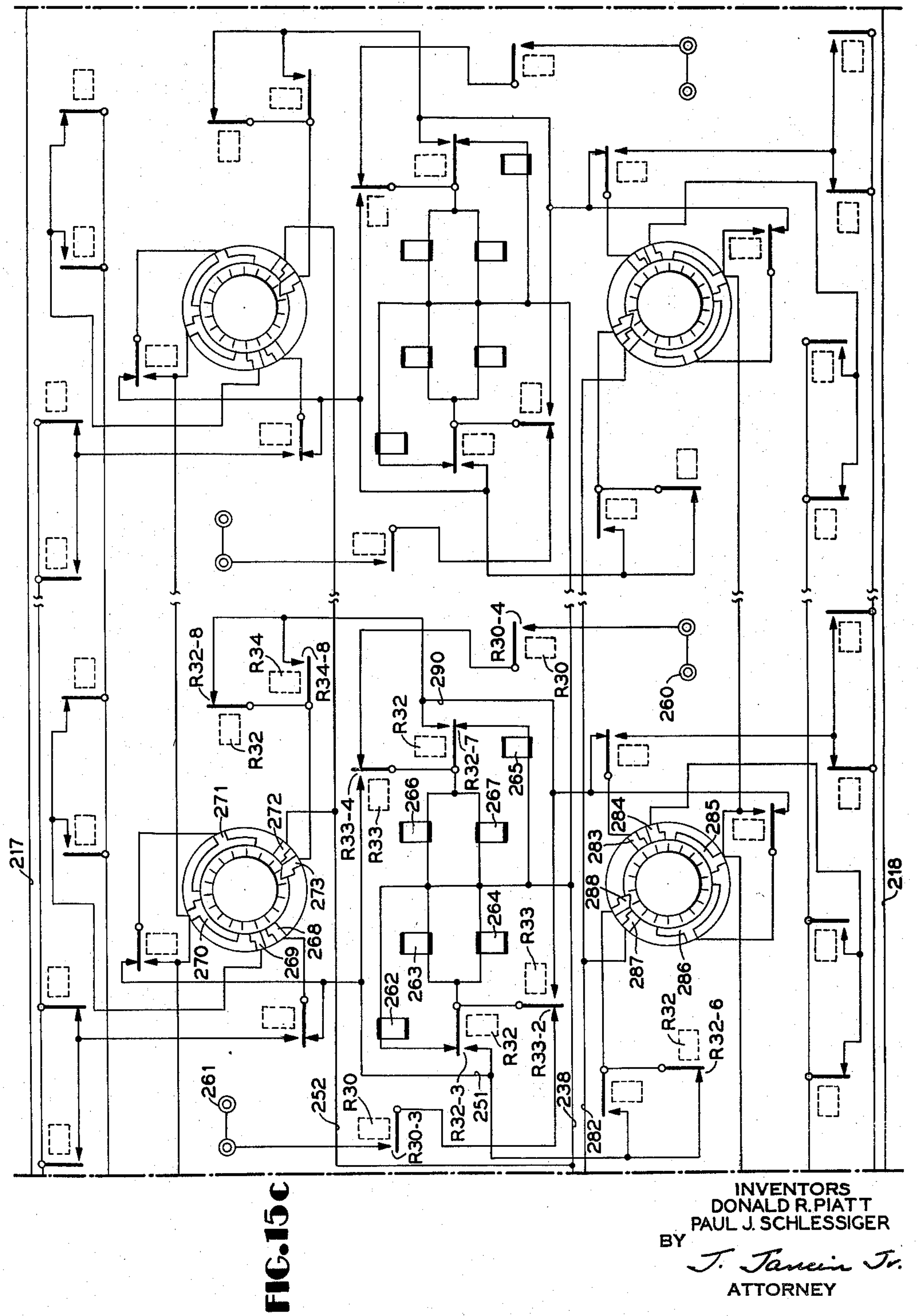
Figure 15D:
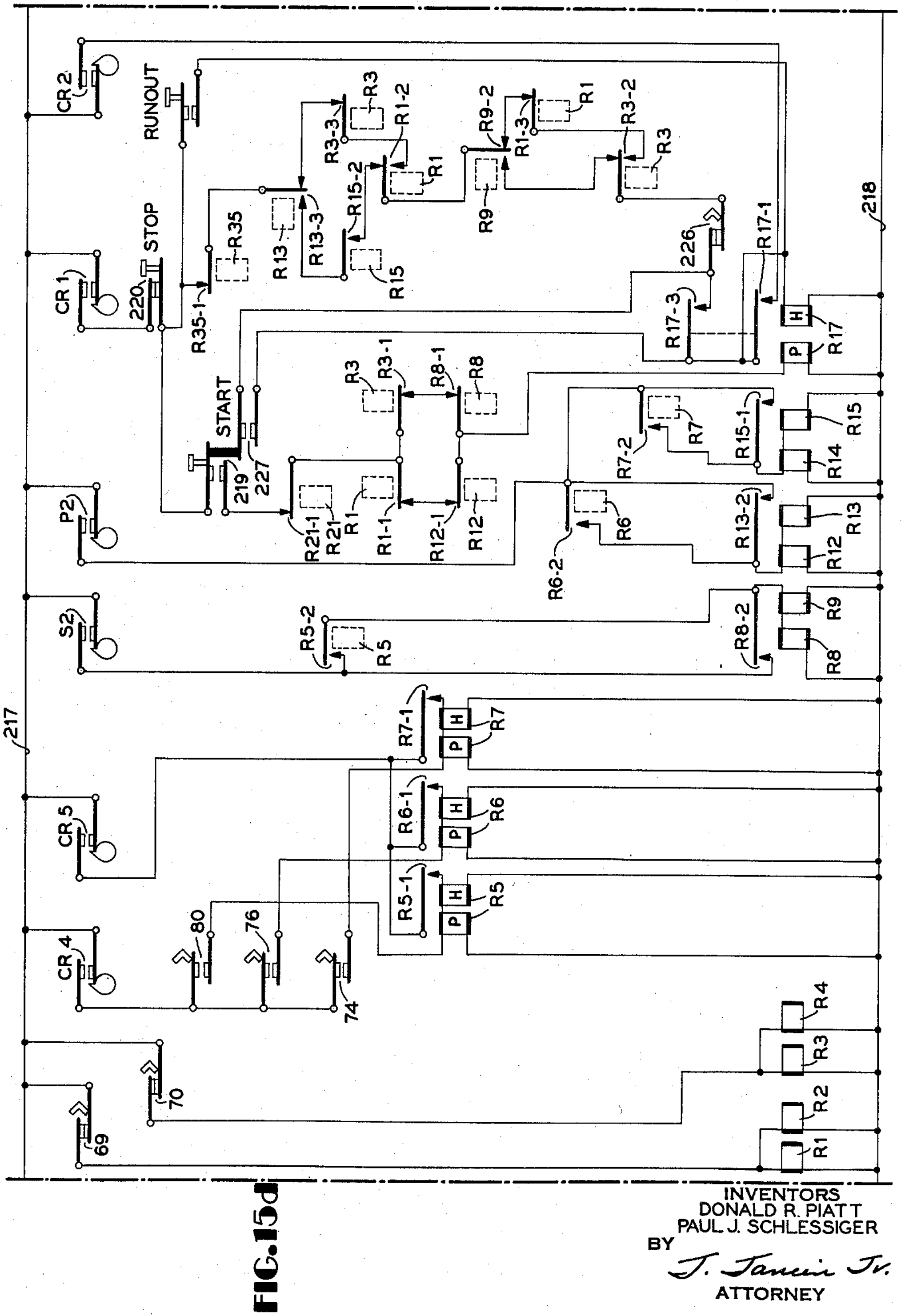
Figure 15E:
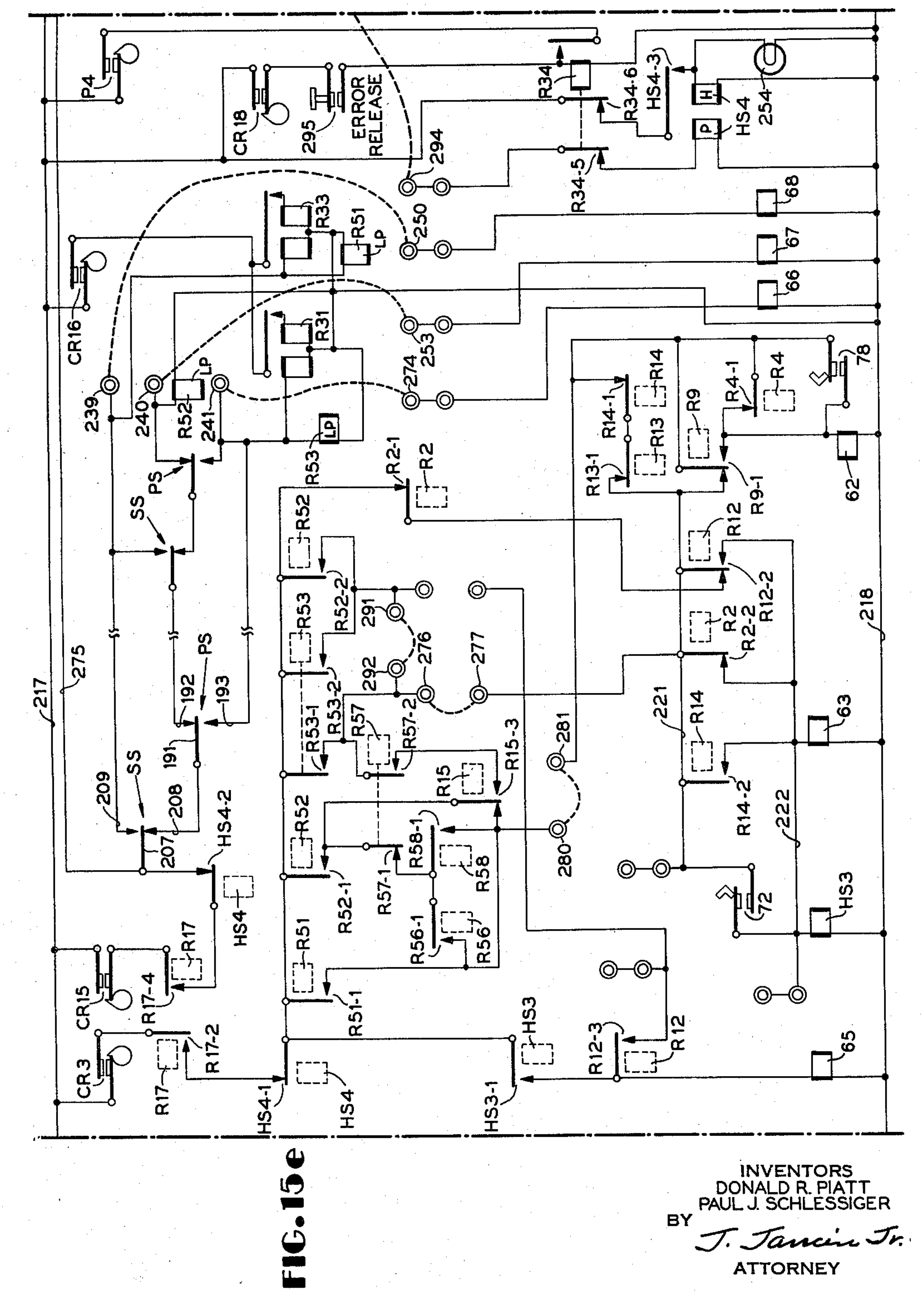

There are various card lever contacts, hopper contacts, cam contacts, etc., shown in the circuit diagrams (Figs. 15*d* and 15*e*). Briefly, as long as cards are in hoppers PH and SH (Fig. 1), hopper contacts 69 and 70 (Fig. 15*d*) are held open and magnets R1, R2, R3 and R4 remain unenergized. During a first cycle of the primary shaft 31, a first card will feed out of hopper PH to a position past the second pair of feed rolls in the primary side and behind the sequence station. In advancing to this position, the card rocks a lever 71 (Fig. 1) to close contacts 72 (Fig. 15*e*). During a second cycle of shaft 31, the second card feeds from the hopper PH, while the first card is advanced through the sequence station. During this advance, the first card rocks a lever 73 (Fig. 1) to close contacts 74 (Fig. 15*d*). During a third cycle of shaft 31, the first card is advanced through the primary station to the eject rolls 39 and 40. In its advance through this station, the card operates a second lever 75 to close contacts 76 (Fig. 15*d*). Continuation of the feed of the card from the eject station to a selected card pocket SP1 or SP2 will depend on the energization of eject magnet 66.

During a cycle of secondary shaft 33 (Fig. 2), a card is fed from the hopper SH (Fig. 1) to a position behind the secondary station, meanwhile operating a lever 77, in the secondary feed line, to close contacts 78 (Fig. 15*e*). During a following cycle of shaft 33, the card will be fed through this reading station to the eject rolls 41 and 42, meanwhile operating card lever 79, in the secondary side, to close contacts 80 (Fig. 15*d*). During a third cycle of shaft 33, the card will be fed to a selected card pocket SP2, SP3 or SP4.

As usual the reading brushes are wired to plug sockets. These pluggable connections are provided to allow for any chosen fields of card columns to be ultimately compared.

Various cam contacts shown in the circuit diagrams are of three classes. One class comprises continuously operating cam contacts including those given the general designation CR and, also, the circuit breaker contacts, the CB's. A second class includes contacts operated only when the primary shaft 31 is running, and cam contacts in this class have the general designation P. The third class includes contacts operating only when the secondary shaft 33 is running, and these cam contacts have the general designation S. Several relays are of the common type having pick-up and hold coils operating on the same armature contacts. The pick-up coil will be identified by letters P inside the box representing the coil. The hold coil will be identified by a similarly placed letter H. Other relays are of the mechanically latching type. Energization of the latch pick coil, designated LP inside the box representing the coil, causes the relay contacts to transfer and to remain transferred until the latch trip coil is energized. The latch trip coil will be identified by similarly placed letters LT.

STORAGE MECHANISM

Figure 3:
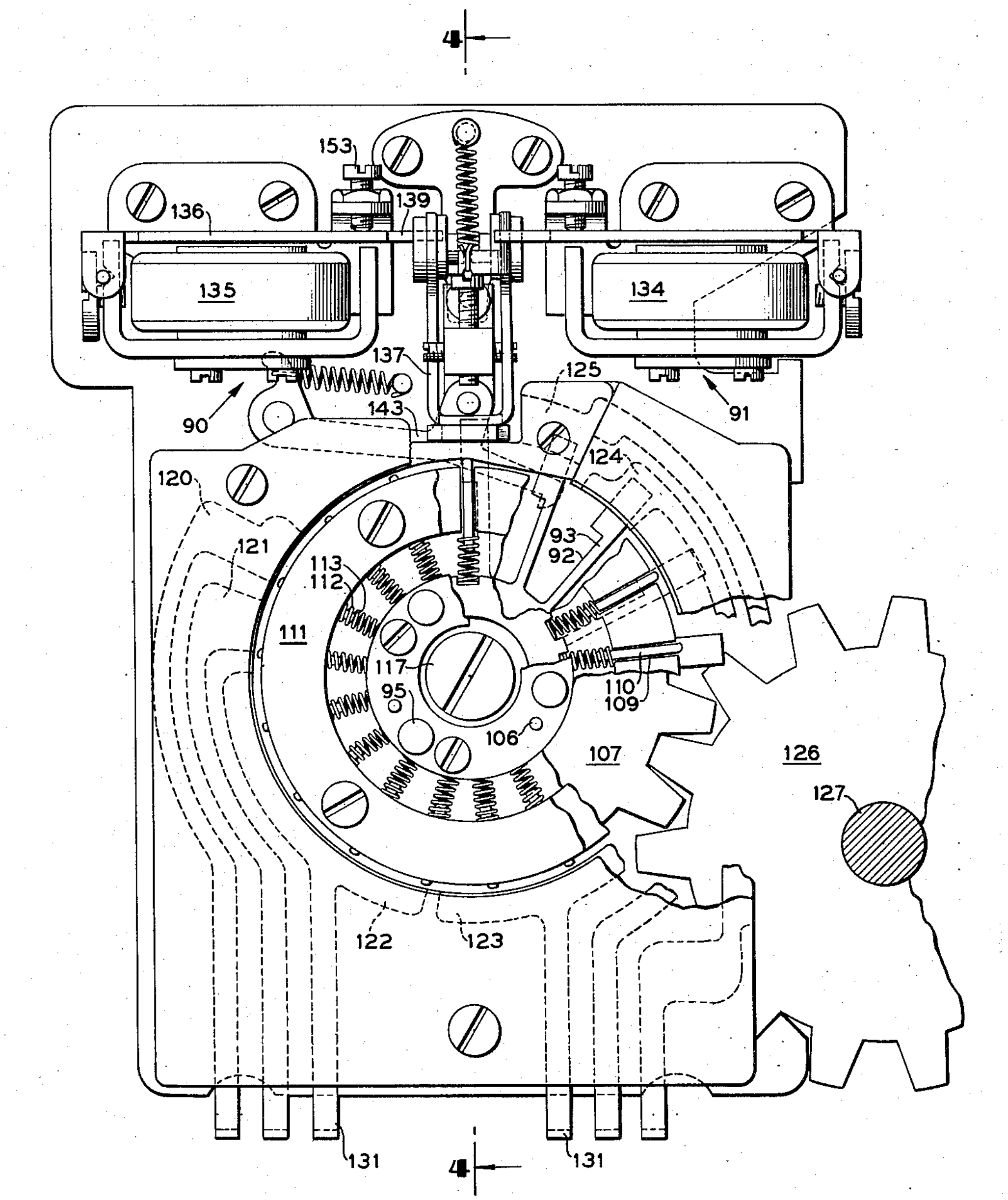
Fig. 3 is a front elevation, with parts in section, of the data storing device.
Figure 4:
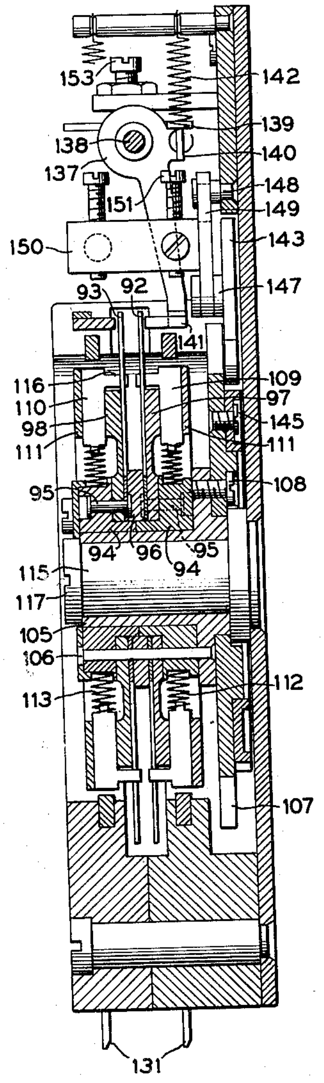
Fig. 4 is a section on the line 4—4 in Fig. 3.
Figure 7:
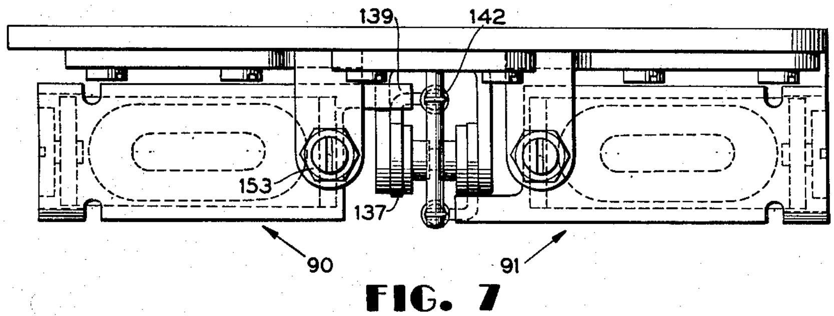
Fig. 7 is a plan view of the data storing device.

A storage plate consisting of two storage units is shown in Figs. 3, 4 and 7 wherein one of the storage units, i.e., the one termed the B unit, is under control of magnet 91. In view of the fact that the construction and operation of each of the A and B storage units is similar, only one of the said units will be described in detail to avoid undue prolixity.

Figure 5:
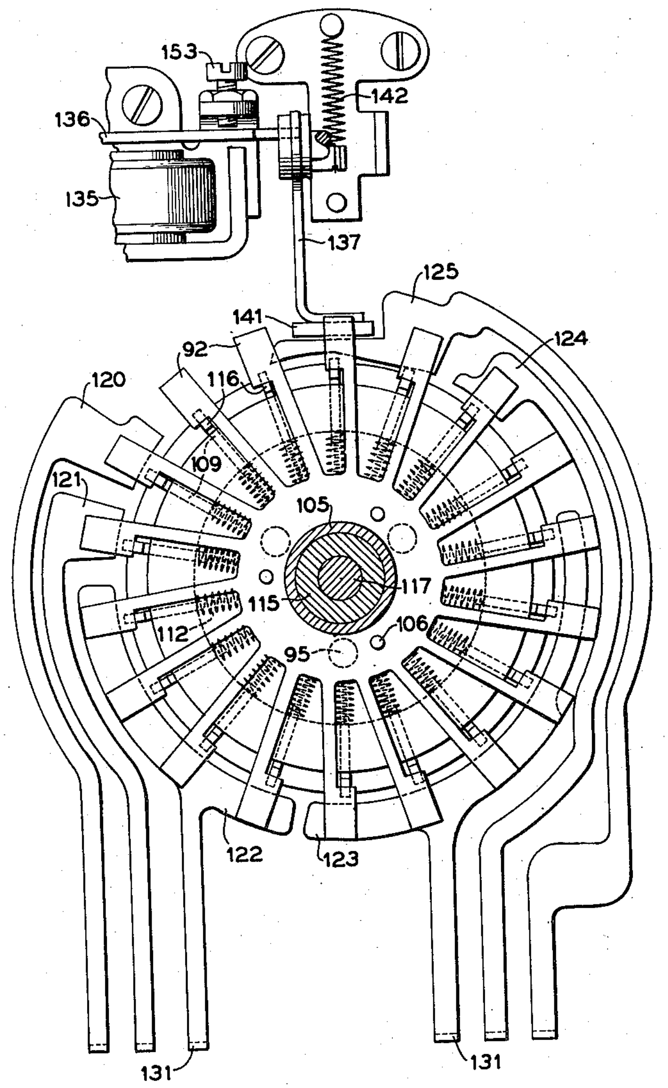
Fig. 5 is a front elevation of the data storing device data carrier, setup mechanism, and readout commutator.

Referring to Figs. 4 and 5, spring latches 92 of the A storage unit and spring latches 93 of the B unit are fastened to contact retainer hubs 94 by rivets 95, and are insulated from each other by separator 96. Frames 97 and 98 are also maintained in position by rivets 95. The so-called wheel assembly including retainer hubs 94, frames 97 and 98, latches 92 and 93, is attached to sleeve 105 by rivets 106. Sleeve 105, in turn, is fixed to driven gear 107 by screws 108. Each of the frames 97 and 98 is suitably grooved so as to house a related contact slug 109 and 110 of the A and B units, respectively. These slugs are equally spaced and radially arranged as is shown in Fig. 5, and are maintained within the said frames by rings 111 (Fig. 3). The outer periphery of retaining hubs 94 (Figs. 4 and 5) is slotted at positions corresponding to the positions of slugs 109 and 110, and each of these slots anchors a respective slug tension spring 112 and 113.

As is shown, eighteen contact slugs 109 of the A storage unit and eighteen contact slugs 110 of the B storage unit are arranged around bearing stud 115. The aforementioned wheel assembly is retained in correct lateral position by screw 117. Referring particularly to the A storage unit shown in Fig. 5, each contact slug 109 is normally maintained in a downward, or latched, position due to the fact that a lateral extension 116 is interlocked with an associated spring latch 92. While the said slugs are held downwardly, i.e., in a latched position, they are prevented from contacting any of the contactors or commutator segments 120 to 124 as the wheel assembly is revolved. It is to be noted that the slugs always engage commutator segment 125 which is necessary to restore unlatched slugs. When slugs 109 are released, or unlatched, in a manner to be described, they are moved radially by springs 112, and are caused to engage the aforesaid commutator segments upon further rotation of the wheel assembly.

A continuously revolving storage plate drive gear 126 (Figs. 2 and 3) rotates the storage plate driven gear 107 which, in turn, causes all of the associated wheel assembly contact slugs and spring latches to move therewith. As is shown in Fig. 2, drive gears 126 are operated continuously by shaft 34 via shafts 127 and 128, and worm gear connections 129 and 130.

Figure 6:
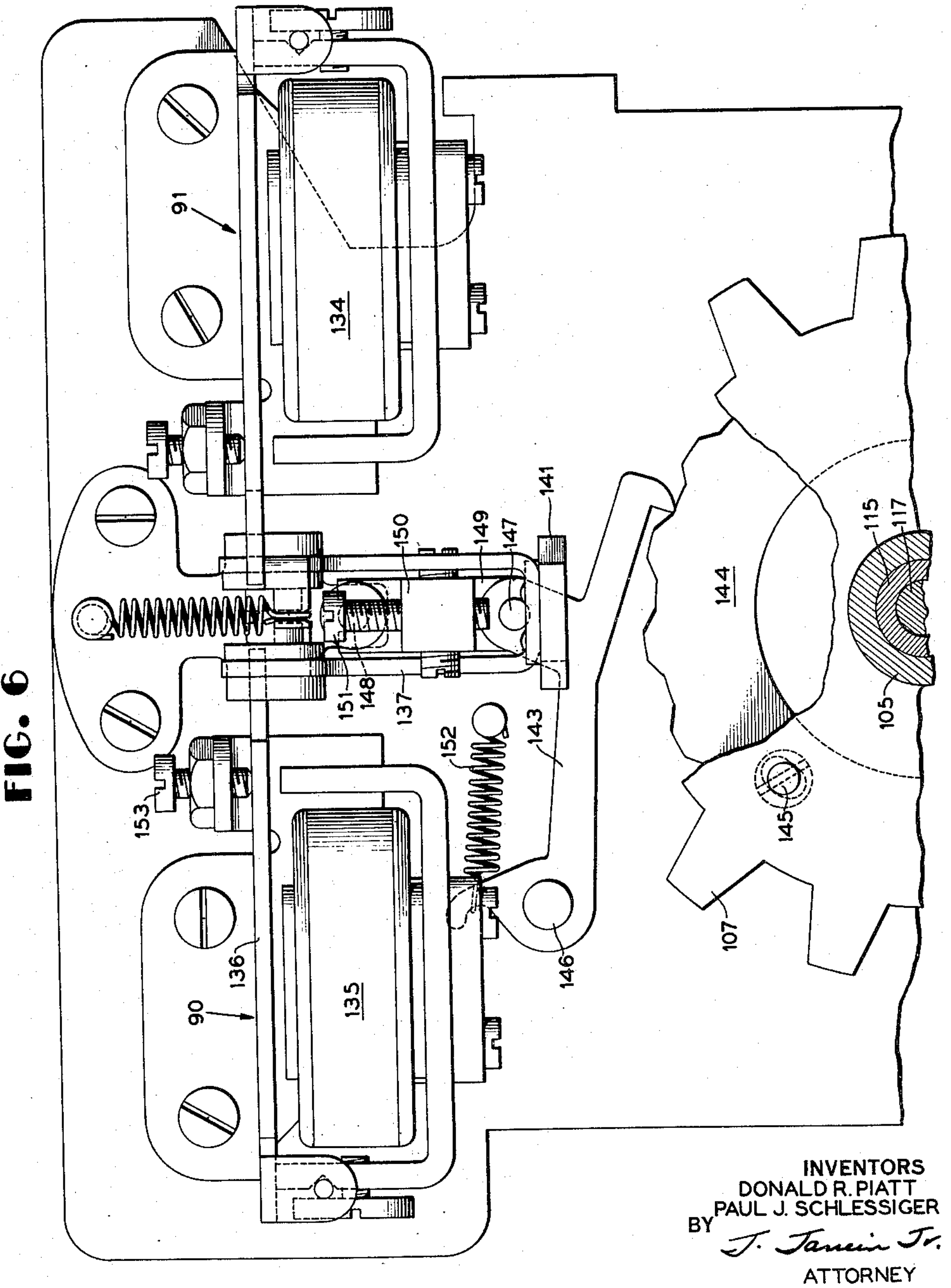
Fig. 6 is a large scale view of the storing device data setup apparatus.

Referring to Fig. 3, when coil winding 135 of magnet 90 is energized by incoming signal data, armature 136 is attracted thereto, whereupon arm 137 is caused to move in a clockwise direction (Fig. 4) about pivot 138. As is shown in Figs. 3 and 4, an extension 139 of armature 136 engages projection 140 of arm 137. As a result of the aforedescribed clockwise movement of arm 137, operating member 141 is moved into engagement with a spring latch 92, thereupon flexing the same sufficiently to unlatch therefrom the related contact slug 109 so as to permit the same to move radially. Arm 137 and armature 136 are restored together by the combined action of return spring 142 and cam operated arm 143 (Fig. 6). Arm 143 is operated upon by cam 144 which is attached, by adjusting screws 145, to driven gear 107 for movement therewith. Cam 144 is adjusted so that arm 143 is moved upwardly about pivot 146 to restore armature 136 and arm 137 after the armature has been attracted due to the energization of coil winding 135. Referring to Figs. 4 and 6, arm 143 is connected to connecting link 149 through stud 147. Restoring block 150, fixedly attached to link 149, is caused to follow the movement of arm 143 as the link reciprocates relative to stud 148. Thus, when arm 143 is moved upwardly, block 150 is also moved upwardly, whereupon restoring stud 151, for the A unit, engages projection 140 of arm 137 to restore the said arm and armature 136. Cam follower arm 143 is biased in a clockwise direction by spring 152 so that it is normally urged into the low dwells of cam 144. Hence, when arm 143 is in a low dwell of cam 144, connecting link 149 carries block 150 downwardly so that restoring stud 151 is out of the way of projection 140. The full amount of movement of armature 136 and arm 137 under the urging of spring 142 is determined by the setting of armature adjusting screw 153.

As described hereinbefore, any of the contact slugs 109 (Fig. 5) that are unlatched from respective spring latches 92, engage the commutator or contact segments 120 to 124 as the wheel assembly rotates in a counterclockwise direction. The design of the face of commutator segment 125 is such as to provide a camming action by which any unlatched contact slug 109 is moved downwardly and into a latched position. Furthermore, it is to be observed that all contact slugs 109, i.e., latched or unlatched, engage commutator segment 125 due to the shape of its face. Accordingly, the contact slugs 109 which are unlatched, are restored, or latched, immediately before being moved into alignment with operating member 141. As will be described more clearly in the storage unit circuit description, the machine operates on a sixteen point cycle basis, and the speed of rotation of gear 107 is such that sixteen contact slugs pass operating member 141 during each machine cycle. Since the storage unit wheel assembly revolves in step with the card feed, a contact slug is moved into alignment with member 141 every index position. There are, however, 18 slugs as is shown in Fig. 5. This is necessary because two slugs are in effect "lost" in order to effect the recirculation of data. If at the time the vertical slug (Fig. 5) is under element 141 represents 9-time during a machine cycle, 16 cycle points later (see also Fig. 17) the same slug will be opposite commutator 124. Should recirculation of data be called for at the time that said slug is opposite commutator 124, the then vertically disposed slug under element 141 would be unlatched to represent a 9.

The commutator segments are arranged to meet the requirements for recirculating data and for making special character tests, all of which will be explained in detail as the description advances.

In summation, the mechanism of a storage plate includes a rotatable wheel assembly comprising driven gear 107, restoring cam 144, contact slugs 109 and 110 of the A and B storage units, respectively, and spring latches 92 and 93 of the A and B storage units, respectively. In addition, this mechanism includes a couple of electromagnets for storage unit entry control. Hence, when coil winding 135 of the A storage unit, for example, is energized, armature 136 is attracted thereto, whereupon arm 137 and operating member 141 attached thereto are moved about pivot 138. Member 141 engages the spring latch 92 in alignment therewith at the time coil winding 135 is energized, thereupon disengaging a related contact slug 109 from the latch. As a result thereof, the released contact slug 109 is caused to move radially by spring 112. The unlatched contact slug remains in an extended position during the period of counterclockwise rotation of the wheel assembly until it engages camming segment 125 which causes the unlatched contact slug 109 to be moved downwardly against the action of spring 112 until the slug is latched once again with its associated spring latch 92.

Furthermore, in summation, the data storage plates for storing record card information in the preferred embodiment shown and described herein, includes, of necessity, a data read-in or input means to enter data for storage, and a data readout or output means to remove data from storage. Data having once been read out of storage, may be re-entered for additional storage via a so-called data recirculating circuit which connects the first mentioned data storing device input and the latter mentioned data storing device output. The said input means includes, in general, all of the data storage device apparatus which must cooperate to unlatch a given slug in response to a data signal, such as is received from a record card reading station for example. The said output means includes, in general, all of the data storage device apparatus which cooperates to direct a data signal from the storage device in response to the detection of corresponding unlatched slugs.

The storage plates are pluggable units, and electrical connections are completed to the coil windings and the commutator segments through slide connectors 131 shown in Figs. 3, 4 and 5.

COMPARING CONTROL MECHANISM

As the description advances, the manner in which the storage units and associated comparing control units, or comparators, cooperate to effect a comparison signal signifying the relative magnitude of two groups of data, will be described in detail.

Figure 9:
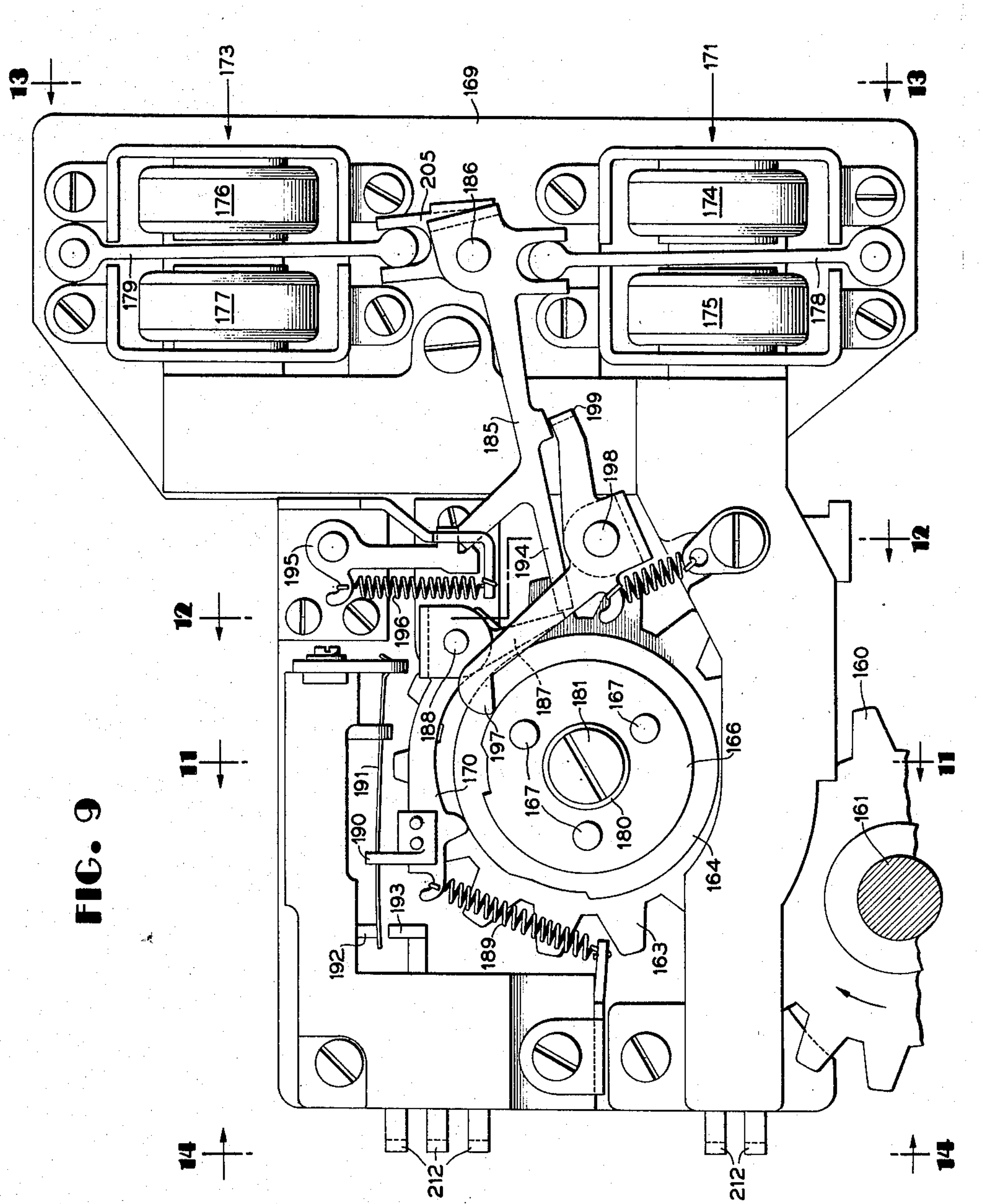
Fig. 9 is a front elevation of the data comparing device.
Figure 10:
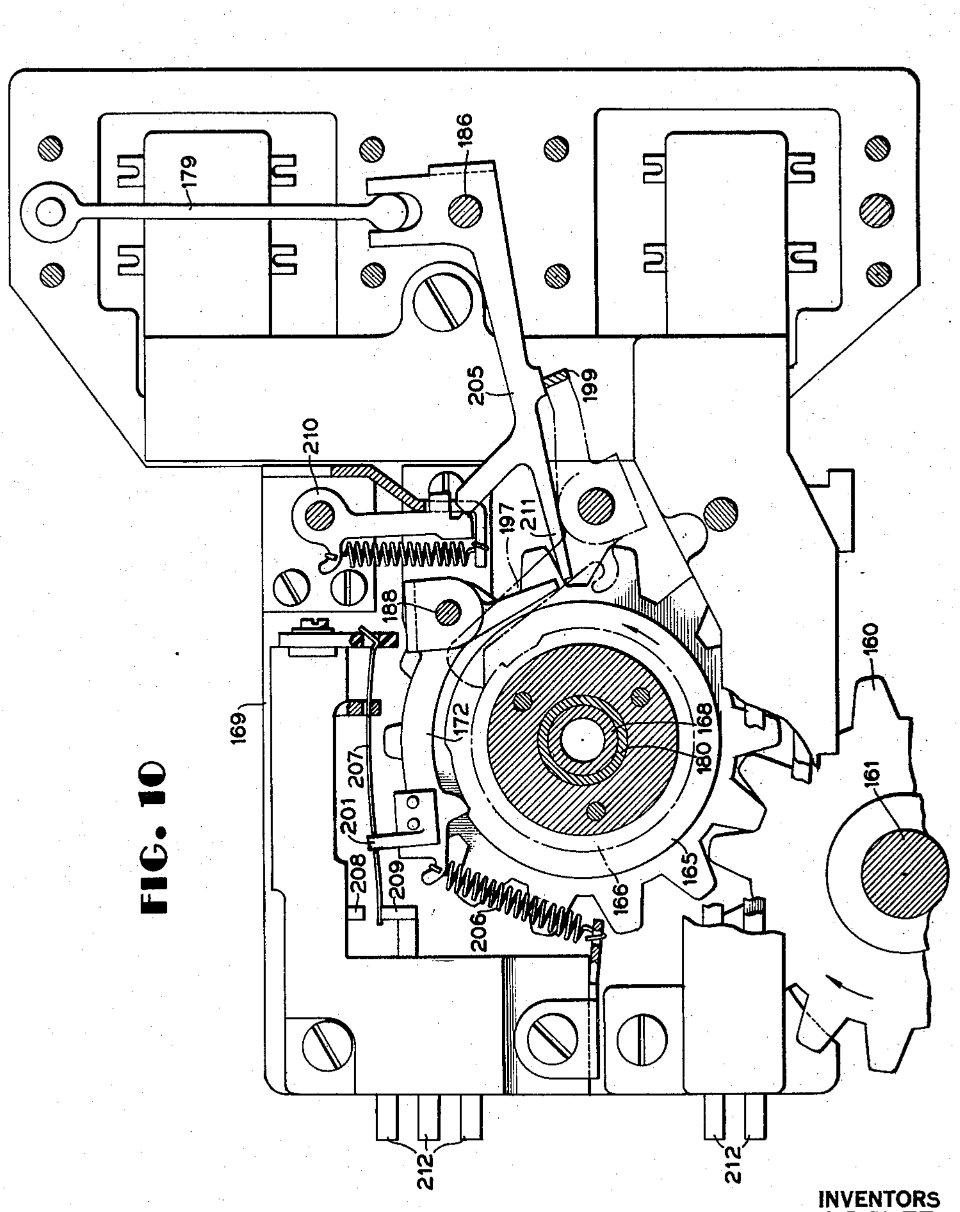
Fig. 10 is a front elevation, with parts removed, of the data comparing device.
Figure 11:
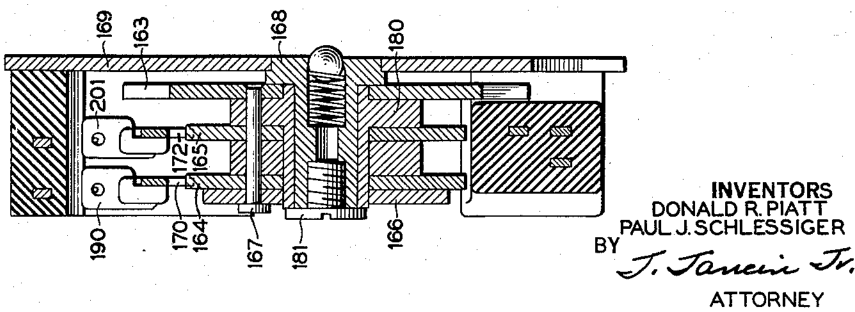
Fig. 11 is a section on the line 11—11 in Fig. 9.

Referring to Fig. 2, continuously rotating control unit drive gears 160 are driven by shaft 34 via shafts 161 and 128, and worm gear connections 162, 129 and 130. As is shown in Figs. 9 and 11, gear 160 causes gear 163 to revolve and to move therewith a wheel assembly comprising cams 164, 165 (Fig. 10), and 166 (Fig. 9), all of which are attached to gear 163 by rivets 167. The aforesaid wheel assembly is fixed to a sleeve 180 and revolves around a bearing stud 168 (Fig. 10) fixed to the mounting plate 169. This assembly is maintained free of lateral movement by a retainer-screw 181. Cam 164 (Fig. 9) engages transfer wire operating arm 170 which, in turn, is associated with comparing magnet unit 171. Cam 165 (Fig. 10), on the other hand, is associated with transfer wire operating arm 172 which, in turn, is associated with comparing magnet unit 173 (Fig. 9). Each of the comparing magnet units 171 and 173 includes a pair of bucking-field coil winding assemblies having coils 174 and 175, and 176 and 177, respectively, positioned in such a manner that a simultaneous current flow through each coil winding of one pair of windings does not effect movement of a related armature 178 or 179. Coils 174 and 176 are always energized concurrently as are coils 175 and 177. As the description advances, the circuit for accomplishing this will be described in detail.

Figure 12:
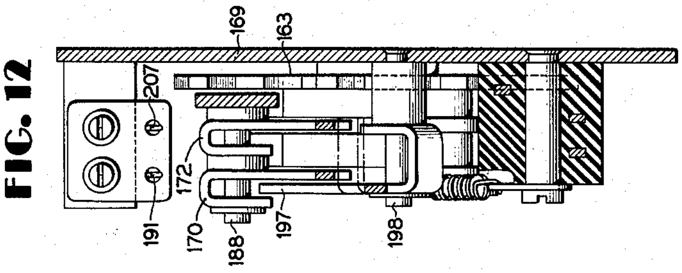
Fig. 12 is a section on the line 12—12 in Fig. 9.

When coils 174 and 176, for example, are energized concurrently, armature 178 is attracted to coil 174, whereupon lever 185 is moved in a counterclockwise direction about pivot stud 186. The preceding action unlatches extension 187 of operating arm 170 so that when the low dwell of cam 164 is presented to the cam follower of the operating arm, the said arm will be urged in a counterclockwise direction about pivot 188 by spring 189. As a result, transfer wire guide 190 (see Figs. 9, 11 and 12) which is attached to operating arm 170, causes transfer wire 191 to shift from contact 192 to contact 193. It may be seen in Fig. 9 that if coils 174 and 176 are not energized, transfer wire 191 will continue to engage contact 192 when the low dwell of cam 164 is presented to the cam follower of arm 170 because extension 187 will be latched with the extended end 194 of lever 185. Armature 178 is maintained in one of two positions by a detent 195 which is biased by spring 196. That is, armature 178 is held in proximity to the core of coil 175 so that extension 187 of operating arm 170 is latched by extension 194 of lever 185, or armature 178 is kept in proximity to the core of winding coil 174 so that operating arm 170 is unlatched by the action of detent 195.

When the low dwell of cam 166 is presented to cam follower 197, the cam follower is moved in a counterclockwise direction around stud 198, whereupon bail 199 engages lever 185 in order to restore lever 185, and latch, once again, operating arm 170.

Similarly, when only coils 175 and 177 are energized concurrently, only armature 179 is moved. As is shown in Fig. 10, this movement of armature 179 causes lever 205 to move in a counterclockwise direction about pivot stud 186 in order to unlatch transfer wire operating arm 172. Hence, when the low dwell of cam 165 is presented to the cam follower of arm 172, biasing spring 206 causes arm 172 to move in a counterclockwise direction, whereupon transfer wire 207 is shifted by guide 201 from contact 208 to contact 209. Detent 210 acts upon lever 205 and armature 179 in the same way that detent 195 (Fig. 9) acts upon lever 185 and armature 178.

The movement of cam follower 197 (Fig. 10) into the low dwell of cam 166 as described previously, causes bail 199 to engage lever 205, thereby restoring lever 205 and armature 179, and latching arm 172 with extended end 211 of lever 205.

Figure 14:
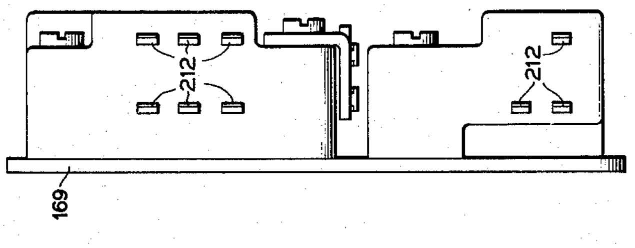
Fig. 14 is a section on the line 14—14 in Fig. 9.
Figure 13:
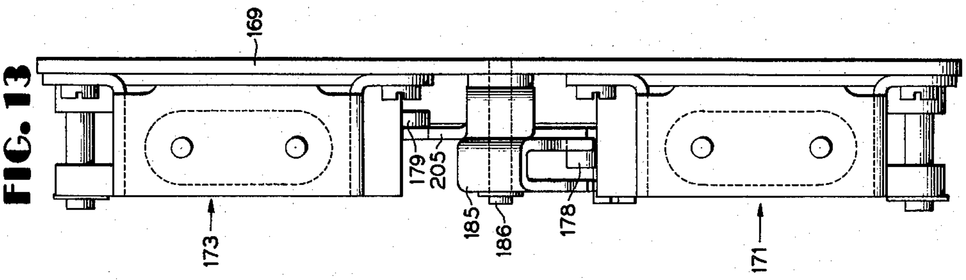
Fig. 13 is a section on the line 13—13 in Fig. 9.

The comparing control units are pluggable units, and electrical connections are completed to the coil windings and the transfer contacts through slide connectors 212 shown in Figs. 10 and 14.

GENERAL CIRCUIT DESCRIPTION

Assuming power is at the voltage terminals 215 and 216 (Fig. 15*a*), e.g., +40 and 0 volts, respectively, so that power is applied to the voltage lines 217 and 218, and assuming cards are present in the primary hopper PH and the secondary hopper SH (Fig. 1), operation of the machine is initiated by depressing a start key. The closure of the start key contacts 219 (Fig. 15*d*) establishes the following circuit:

*Initiating start key circuit.*—From the +40 volt line 217, through cam contacts CR1, stop key contacts 220, start key contacts 219, relay contacts R21–1, R1–1 or R3–1 and R12–1 or R8–1, coil R17P, to the other side of the line.

Contacts R17–1 now closed, and together with cam contacts CR2 establish the circuit of coil R17H.

Relay contacts R17–2 (Fig. 15*e*) also close, and the following circuit is then completed:

*Primary feed magnet and HS3 circuit No. 1.*—From the +40 volt line 217, through CR3, R17–2, HS4–1, R2–1, R12–2 normally closed (n/c), R2–2 via wire 221, primary feed magnet 63, and parallel magnet HS3 via wire 222, to the other side of the line.

Magnet HS3 closes contacts HS3–1, whereby the following circuit is closed:

*Eject magnet circuit No. 1.*—The +40 volt line 217, through CR3, R17–2, HS4–1, HS3–1, eject magnet 65, to line 218.

The contact R17–2, when closed, also causes the following circuit to be completed:

*Secondary feed magnet circuit No. 1.*—The +40 volt line 217, through contacts CR3, R17–2, HS4–1, R2–1, R12–2 n/c, R9–1 n/c via wire 221, or R13–1 and R14–1 via wire 221, R4–1, secondary feed magnet 62, to the other side of the line.

The clutch magnets 62 and 63 having been energized, primary and secondary card feed cycles ensue. During the primary cycle, a card is fed from hopper PH (Fig. 1) to a position just behind the first primary card lever 73. During the secondary cycle, a card is fed from hopper SH to a position just behind the secondary card lever 79.

The eject clutch magnet 65 also has been energized, whereby eject rolls are operated, but no card is present at the eject station at this time. Had a card been present, it would have been ejected to a selected one of the pockets SP1 and SP2.

Cam contacts CR2 (Fig. 15*d*) open before the primary and secondary cycles end. Accordingly, coil R17H is de-energized. The secondary primary and secondary cycles must be initiated in the same way as the first of such cycles, i.e., coil winding R17P is energized through start key contacts 219. Coil R17H, then becomes energized via CR2 after which the other circuits, traced hereinbefore, are established. During the second primary and secondary cycles the second cards are fed out of the hoppers PH and SH (Fig. 1), while the first primary and secondary cards are fed through the sequence and secondary sensing stations, respectively. The first primary card stops just behind the second primary card lever 75, meanwhile having acted on the first primary card lever 73 to close contacts 74 (Fig. 15*d*). The first secondary card stops behind the rear ends of chute blades 55 and 56 (Fig. 1), meanwhile having acted on the secondary card lever 79 to close contacts 80 (Fig. 15*d*). Circuits accordingly are established, as follows:

*Coil R5P circuit.*—The +40 volt line 217, through CR4, R5P via contacts 80, to the other side of the line.

*Coil R7P circuit.*—The +40 volt line 217, through CR4, R7P via contacts 74, to line 218.

The coil windings R5H and R7H subsequently are energized via the respective contacts R5–1 and R7–1, and cam contacts CR5.

During the secondary card feed cycle, cam contacts S2 close and together with contacts R5–2 (now closed), establish the circuit of parallel coils R8 and R9. Contacts R8–2 close to hold the circuit after contacts R5–2 open.

During the primary cycle, cam contacts P2 (Fig. 15*d*) close and in conjunction with contacts R7–2 establish the circuit of parallel coils R14 and R15. Contacts close to maintain the circuit in effect after contacts R7–2 open.

The start key is held down to allow operations to continue, and a third primary cycle will occur. But the third secondary cycle will not occur at this time, because relays R9 (Fig. 15*d*) and R14 remain energized at the completion of the preceding cycle. Hence, contacts R9–1 and R14–1 (Fig. 15*e*) are transferred so that the secondary feed magnet 62 circuit No. 1, previously traced, is unable to make and magnet 62 is not energized. No other circuit is made at this time through magnet 62, whereupon a secondary cycle does not occur.

During the third primary cycle, a card PC is fed from hopper PH (Fig. 1), the second card PC is fed to the second cycle position, and the first card PC is fed through the primary sensing station, to the eject rolls. On its way, the first card acts on the second primary card lever 75 (Fig. 1) to close contacts 76 (Fig. 15*d*), establishing the following circuit:

*Coil R6P circuit.*—The +40 volt line 217, through CR4, R6P via contacts 76, to the other side of the line.

Contacts R6–1 close, whereupon R6H subsequently is energized upon closure of cam contacts CR5.

Meanwhile, cam contacts P2 close and together with contacts R6–2 establish the circuit of parallel relay coils R12 and R13. Contacts R13–2 close to hold the circuit after contacts R6–2 open.

It should be noted that during the third primary card feed cycle, the second card PC is acted upon in the same way as the first card in the preceding cycle to bring about the energization of relays R7, R14 and R15.

After the third cycle, relay coil R17H remains energized under the assumed conditions, and the start key may be released. The circuit for coil R17H will be held through contacts CR2 and R17–1, and during the interval in which contacts CR2 are open, the following alternate circuit will be established:

*Coil R17H hold circuit.*—The +40 volt line 217, cam contacts CR1, stop key contacts 220, contacts R35–1, R13–3 normally open (n/o), R15–2, R1–2 n/c, R9–2 n/o, R3–2 n/c, safety contacts 226, contacts R17–3, coil R17–H, to line 218.

It is to be observed, at this point, that the relays R12 and R8 both are energized; hence the initiating start key circuit cannot be re-established. Should the coil R17H hold circuit be broken subsequently, if by temporarily opening the stop key contacts 220, the circuit of coil R17H may be re-established by again depressing the start key. A circuit will thereupon be established through coil R17H which is the same as the R17H hold circuit except that it is routed via start key contacts 227 which shunt contacts R17–3.

Since contacts R9–1 (Fig. 15*e*), R12–2 and R14–1 now are in operating status, the secondary feed magnet 62 circuit No. 1, previously traced, is unable to make and magnet 62 is not energized. Whether an alternative circuit will make through magnet 62 depends on control panel plugging and on card comparison, which will be explained later.

The relay R12 (Fig. 15*d*) has been energized during the third primary cycle, at a time preceding a closure period of cam contacts CR3 (Fig. 15*e*). Accordingly, the previous circuit traced through primary feed magnets 63

(Fig. 15*e*) and HS3 cannot make and these magnets are not energized, since contacts R12–2 now have been shifted. Whether a new primary feed cycle shall be performed depends on control panel plugging and card comparisons, all to be explained as the description advances.

STORAGE AND COMPARING CONTROL CIRCUITS

Prior to describing the storage and comparing control circuits, it will be well to repeat here the prescribed scale of relative magnitude of values represented by punched holes in the card. This scale, in ascending order, is as follows:

(1) Blank column.
(2) Special symbols in the order R, X, R–8–3, R–8–4 X–8–3, X–8–4, O–8–3, O–8–4, 8–3, 8–4 and 0–1.
(3) Letters A to Z.
(4) Numerals 0 to 9.

It may be well to repeat here also that the wheel assembly of each storage plate revolves continuously at a speed such that sixteen of the eighteen contact slugs, slugs 109 for example, move past operating member 141 during each machine cycle.

Referring to Figs. 15*a* and 17, relays R30, R32, R34, R35 and R36 are energized each machine cycle through cam contacts CR10 to CR14, respectively.

As mentioned previously, in comparing, for relative magnitude, data derived from denominationally related card columns, it is required that the relation of the values of the higher denominations dominate the relation of values in the lower orders. Comparison circuits, each for a different denomination, are therefore connected in tandem to control comparison result means so that the comparison signal passes therethrough in seriatim. As the number of comparison circuits required in any one given machine is a variable, and since each of the comparison circuits is similar, it is believed necessary to describe in detail only one comparison circuit. Two cross-feed card comparison circuits are shown in Fig. 15*b*, and similarly, two primary feed sequence comparison circuits are shown in Fig. 15*c*.

In order to afford cross-feed card comparison between cards SC being fed in the secondary feed and cards PC being fed in the primary feed, storage and control hub 230 (Fig. 15*b*), for example, is control panel wired to a secondary reading brush hub 232 (Fig. 15*a*) and storage and control hub 231 (Fig. 15*b*) is control panel wired to a primary reading brush hub 233 (Fig. 15*a*). It is well known to persons familiar with this art that the reading brush hubs selected for control panel plugging are those corresponding to the card columns to be read. Hence, assuming that secondary hub 232 and primary hub 233 each correspond to card column 1, and the said hubs are wired, as described above, to hubs 230 and 231, respectively, as a card is fed past the secondary reading station, an electrical impulse corresponding to a punched hole in column 1 will be transmitted to hub 230 via the following circuit:

*Secondary reading circuit.*—The +40 volt line 217 (Fig. 15*a*), through cam contacts CR6, CB1 or CB2 and CB3 or CB4, relay contacts R5–3 via wire 235, common brush 236, secondary contact roll SC, the punched hole in column 1 of card SC and the corresponding reading brush SB, to hub 230 (Fig. 15*b*) via hub 232 (Fig. 15*a*) and the control panel wire (not shown).

As a card PC is fed past the primary reading station, an electrical impulse corresponding to a punched hole in column 1 of the card will be transmitted to hub 231 (Fig. 15*b*) through the following circuit:

*Primary reading circuit.*—The +40 volt line 217 (Fig. 15*a*), through cam contacts CR6, CB1 or CB2 and CB3 or CB4, relay contacts R6–3 n/o via wire 235, common brush 237, primary contact roll PC, the punched hole in column 1 of card PC and the corresponding reading brush PB to hub 231 (Fig. 15*b*) via hub 233 (Fig. 15*a*) and the control panel wiring (not shown).

*Equal numeric comparison.*—Assuming, for instance, that a 9 hole is read in column 1 of card SC being fed past the secondary reading station at the same time that a 9 perforation in column 1 of card PC is read at the primary reading station, at 13.5° (Fig. 17) simultaneous impulses will be transmitted to hub 230 (Fig. 15*b*) through the aforedescribed secondary reading circuit and to hub 231 through the aforedescribed primary reading circuit. This secondary circuit impulse will be transmitted through relay contacts R30–1, R31–1 n/c, and R32–1 n/c, to energize coil winding 135 of storage unit A. In addition, this impulse, through contacts R30–1 and R31–1 n/c, will be effective to energize comparison control unit coils 175 and 177. At precisely the same time, i.e., 13.5°, an impulse will be transmitted to hub 231 through the aforedescribed primary reading circuit, to thereby energize concurrently winding coil 134 of storage unit B and comparison control coils 174 and 176. R33–1 n/c, R32–2 n/c, and coil 134, to the other side of the line via wire 238; and through contacts R30–2, R33–1 n/c, and control coils 174 and 176 to line 218 via wire 238.

The energization of storage coil 135 causes operating member 141 (Fig. 4) to trip a spring latch 92 on the wheel assembly of the storage unit as described hereinbefore, thereupon releasing a contact slug 109 to engage the A storage unit commutator. Similarly, the energization of storage coil 134 causes a contact slug 110 associated therewith to unlatch and engage the B storage unit commutator. As explained hereinbefore, each storage wheel assembly rotates continuously and in timed relation with the card feeds so that the contact slugs released to engage the commutator are each indicative of the holes read in the cards.

As is shown in Fig. 9, the coils 174 and 175, and 176 and 177 within magnet units 171 and 173, respectively, are so arranged that a simultaneous current passage through the pair of coils within a magnet unit causes a zero magnetic field. In magnet unit 171, armature 178 is normally against the coil 175, whereas in the other unit armature 179 is normally against coil 176. These positions of the armatures maintain transfer wires 191 and 207 (Fig. 10) in their normal positions. Hence, the simultaneous energization of coils 174 to 177 has no effect on armatures 178 and 179, and when the low dwell of cams 164 and 165 (Fig. 10) are opposite the cam followers of arms 170 and 172 (Fig. 10), respectively, their respective transfer wires 191 and 207 remain in engagement with contacts 192 and 208, respectively. As a result, an equal comparison impulse will be transmitted from hub 240 (Fig. 15*e*) via a circuit to be described in detail hereinafter. For purposes of this description, the switch including wire 207 and contacts 208 and 209 will be designated SS, and the one including wire 191 and contacts 192 and 193 will be termed PS.

*Unequal numeric comparison.*—Assuming that card SC being read at the secondary reading station has a 9 hole punched in column 1, and the card PC being read at the primary reading station has an 8 hole punched in column 1, at 13.5° a 9-timed pulse will be transmitted to hub 230 through the aforedescribed secondary reading circuit in order to simultaneously energize coil 135 of storage unit A and control coils 175 and 177. However, since a 9-timed impulse is not transmitted to hub 231 so as to energize comparison coils 174 and 176 at that time, armature 179 (Fig. 9) will be attracted to coil 177. As described previously, this movement of armature 179 will cause lever 205 (Fig. 10) to move in a counterclockwise direction so as to unlatch transfer wire operating arm 172.

At 36°, an 8-timed impulse will be transmitted to hub 231 (Fig. 15*b*) to energize simultaneously coil 134 of storage unit B and control coils 174 and 176 via circuits described hereinbefore. In view of the fact that at this time, i.e., at 8-time, the control coils 175 and 177 are not energized, armature 179 (Fig. 9) will be returned to its normal position by energized coil 176, whereupon arm 172 (Fig. 10) will be latched once again with extended end 211 of lever 205. In addition thereto, armature 178 (Fig. 9) will be attracted to coil 174, whereupon lever 185 will be moved in a counterclockwise direction and unlatch operating arm 170. Thus, at 315°, cam follower arm 170 will move in a counterclockwise direction about pivot 188 when it engages the low dwell of cam 164 and thereby shift transfer wire 191 into engagement with contact 193. Wire 207 (Fig. 10), however, will remain in engagement with contact 208 due to the fact that arm 172 was relatched when armature 179 was returned to its normal position upon the energization of coil 176. As a result, a low primary comparison impulse will be transmitted to hub 241 (Fig. 15*e*) via a circuit to be described hereinafter.

*Unequal alphabet comparison.*—Assuming that card SC being read at the secondary reading station has combinational R–1 holes punched in column 1 to represent the alphabetic letter A, and assuming that the card PC being read at the primary reading station has combinational X–1 holes punched in column 1 to represent the alphabet letter J, a low secondary comparison impulse will be transmitted to hub 239 (Fig. 15*e*). As the two cards pass their respective reading brushes nine edge forward, the 1 hole in each of the cards will be read first. Thus, at 193.5° an impulse will be transmitted to hub 230 (Fig. 15*b*) via the aforedescribed secondary reading circuit, and to hub 231 via the aforedescribed primary reading circuit, thereby energizing concurrently the storage coils 134 and 135, and comparison control coils 174 through 176. As described hereinbefore, the simultaneous energization of control coils 174 and 176 does not move armatures 178 (Fig. 9) and 179. At X-time, 238.5°, an impulse will be transmitted to hub 231 (Fig. 15*b*), whereupon control coils 174 and 176, and storage coil 134 are energized through the circuit described previously. In view of the fact that control coils 175 and 177 are not energized at this time, only armature 178 will be attracted to coil 174. Thus, lever 185 is rocked in a counterclockwise direction to unlatch operating arm 170. At R-time, 261°, an impulse is transmitted to hub 230 (Fig. 15*b*) to energize concurrently storage coil 135 and control coils 175 and 177. This causes armature 178 to move towards coil 175 and armature 179 to move towards coil 177. As a result thereof, lever 185 is moved in a clockwise direction to relatch arm 170, and lever 205 (Fig. 10) is moved in a counterclockwise direction to unlatch wire operating arm 172. Thus, at 315° when the low dwells of cam 164 and 165 (Fig. 10) are presented to the cam followers of arms 170 (Fig. 9) and 172 (Fig. 10), respectively, only transfer wire 207 will shift to engage contact 209. Transfer wire 191 will remain in engagement with contact 192. Accordingly, a low secondary impulse will be transmitted to hub 239 (Fig. 15*e*) via a circuit to be described hereinafter.

*Blank column and special character test circuits.*—Circuits are effective every card feed cycle to determine the presence of blank columns or special characters in the record cards, and to determine the relative magnitude therebetween, and between special characters, and letters and numerals.

*Special character R and X test.*—This special character test is based upon the detection of the absence of numeric indicia in combination with the R or X zone indicia. Assuming that the card SC being read at the secondary reading station has an X hole punched in column 1 to represent a dash, and assuming that the card PC being read at the primary reading station has combinational R–9 holes punched therein to represent the alphabetic character I, at 9-time an impulse will be transmitted to hub 231 (Fig. 15*b*) so as to energize concurrently coil 134 of storage unit B and comparison control coils 174 and 176. As a result, armature 178 (Fig. 9) is attracted to coil 174 whereby operating arm 170 is unlatched when lever 185 is moved in a counterclockwise direction. At X-time, an impulse is transmitted to hub 230 to energize concurrently coil 135 of storage unit A, and coils 175 and 177. This action causes armature 179 to move towards coil 177 and armature 178 to move towards coil 175, whereupon operating arm 170 is relatched when lever 185 is moved in a clockwise direction and operating arm 172 is unlatched when lever 205 is moved in a counterclockwise direction. At R-time, an impulse is once again transmitted to hub 231 via the aforedescribed secondary reading circuits, whereupon coils 134, 174 and 176 are energized concurrently. This causes armature 178 to be attracted to coil 174, and armature 179 to be attracted to coil 176. As a result thereof, operating arm 170 is once again unlatched when lever 185 is moved in a counterclockwise direction, and operating arm 172 is relatched when lever 205 is moved in a clockwise direction.

At 298°, cam contacts CR7 (Fig. 15*a*) close to apply voltage to commutator segment 122 via wire 242, and to commutator segment 123 via contact R34–1 n/o and wire 242. Contacts CR7 also cause voltage to be applied to commutator segment 246 via wire 243, and to segment 247 via contact R34–2 n/o and wire 243.

It is to be recalled that each storage unit wheel assembly revolves continuously and in step with the advancement of the cards through their respective feeds. Commutator segments 122 and 123 are arranged so that a contact slug released as a result of reading a numeric hole in the card, will engage one or the other of said segments at 298°. Hence, the circuits in which segments 122 and 123 are situated will be open because a numeric hole is lacking in the secondary card SC.

Commutator segments 246 and 247 are arranged in the B storage unit as are segments 122 and 123 arranged in the A unit. Since a contact slug 110 was released at 9-time due to the fact that numeric data was read at the primary reading station, the following circuit is completed to energize comparison control coils 175 and 177 at 298°.

The +40 volt line 217 (Fig. 15*a*), through cam contacts CR7, contacts R34–2 n/o via wire 243 (Fig. 15*b*), commutator segment 247, contact slug 110 which was unlatched at 9-time, the contact slug common frame, camming commutator segment 249 via a slug 110 engaged therewith, contacts R34–3, R32–1 n/o, coils 175 and 177, to the other side of the line via wire 238.

Therefore, armature 179 (Fig. 9) is attracted to coil 177 and armature 178 is attracted to coil 175, whereupon lever 185 is moved in a clockwise direction to latch, once again, operating arm 170, and lever 205 (Fig. 10) is moved in a counterclockwise direction to unlatch operating arm 172. This action permits only transfer wire 207 to shift at 315° when the low dwell of cam 165 is presented to the cam follower of operating arm 172. As a result, a low secondary comparison impulse is emitted from hub 239 (Fig. 15*e*).

*Blank column test.*—Assume that the card SC being read at the secondary reading station is not perforated in column 1, and the card PC being read at the primary reading station has an R hole punched in column 1. At R-time, an electrical impulse will be transmitted to hub 231 (Fig. 15*b*) to energize concurrently storage coil 134 and control coils 174 and 176. As a result, operating arm 170 (Fig. 9) will be unlatched as described hereinbefore. It is to be observed that normally an R hole punched in the primary card PC indicates a low reading when compared to a blank column secondary card. At 311°, cam contacts CR8 (Fig. 15*a*), CR9, and CR7 close to test the storage units for a blank column reading. Relays R32 (Fig. 15*a*) and R34 to R36 are energized at this time to cause voltage to be applied to the following circuits:

(1) The +40 volt line 217 (Fig. 15*a*) through contacts CR8, relay contacts R36–1 (Fig. 15*b*) via line 255, R35–2 n/o, to commutator segment 120. Since a contact slug 109 was not unlatched at R-time (the secondary card column read is blank), the circuit is open at this point.

(2) The +40 volt line 217 (Fig. 15*a*), through contact CR9, relay contact R36–2 (Fig. 15*b*) via wire 256, to commutator segment 121. Since a contact slug 109 was not unlatched at X-time, the circuit is open at this point.

(3) The +40 volt line 217 (Fig. 15*a*), through contact CR7, to commutator segment 122 (Fig. 15*b*) via wire 242, and through a parallel circuit consisting of relay contact R34–1 n/o to commutator segment 123. Since a contact slug 109 was not unlatched at 9 to 0 time, the circuits are open at this point. Consequently, since the card SC in the secondary feed is blank, and since there is not any contact slug engaging segments 120, 121, 122 or 123, the fact that the foregoing test circuits are all open at the commutator segments indicates a blank column in the secondary card.

(4) The +40 volt line 217 (Fig. 15*a*), through cam contact CR8, relay contacts R36–3 (Fig. 15*b*) via wire 257, R35–3 n/o, to commutator segment 244.

(5) The +40 volt line 217 (Fig. 15*a*), through cam contacts CR9, relay contacts R36–4 (Fig. 15*b*) via wire 258, to commutator segment 245.

(6) The +40 volt line 217 (Fig. 15*a*) through cam contacts CR7, to segment 246 (Fig. 15*b*) via wire 243, and through a parallel circuit consisting of contact R34-2 n/o to commutator segment 247.

Since an R hole was read at the primary reading station, a contact slug 110 was released at R-time. Consequently, a circuit is completed through commutator segment 244, the unlatched contact slug 110, the contact slug common frame, camming commutator segment 249, relay contacts R34–3, R32–1 n/o, control unit coils 175 and 177, to line 218 via wire 238. As described hereinbefore, the energization of the control unit coils 175 and 177 causes the unlatching of operating arm 172 (Fig. 10), in order to permit transfer wire 207 to engage contact 209 at 315° when the cam follower of operating arm 172 engages the low dwell of cam 165. In view of the fact that armature 178 (Fig. 9) had previously been attracted to coil 174, this armature is simple returned to its normal position against coil 175, when the same is energized, in order to latch operating arm 170 when lever 185 is moved in a clockwise direction. As a result, a low secondary comparison impulse is transmitted to hub 239 (Fig. 15*e*) via a circuit is be described hereinafter.

*Special character 0–1 test.*—Assume that the card SC being read at the secondary reading station has combinational 0–1 holes in column 1, and the card PC being read at the primary reading station has an R hole punched in column 1. After each card has passed its respective reading station, the control unit associated with the primary reading station will be set to indicate a low primary condition because the R hole in card PC was was the hole read last. However, as is shown in Fig. 8, the 0–1 combination represents a special character whose relative value is low when compared to alphabetical or numerical data. At 273°, cam contacts CR9 close to complete the following 0–1 special character test circuit:

The +40 volt line 217 (Fig. 15*a*), through cam contacts CR9, relay contacts R35–4 (Fig. 15*b*) via wire 256, commutator segment 121, the contact slug 109 which was unlatched at 1-time due to the 1 hole in the card SC, the contact slug common frame, commutator segment 120 through the contact slug 109 which was unlatched at 0-time due to the 0 hole in card SC, relay contacts R35–2 n/c, R32–1 n/o, control unit coils 175 and 177, to the other side of the line via wire 328.

A similar 0–1 test impulse is transmitted to commutator segment 245 via wire 258 and relay contacts R35–5. Since there were no contact slugs 110 unlatched at 0-time and at 1-time, the test circuit is open.

The concurrent energization of control coils 175 and 177 as a result of the 0–1 special character test impulse, causes lever 205 (Fig. 10) to be rocked in a counterclockwise direction, whereupon transfer wire 207 is caused to engage contact 209 when the low dwell of cam 165 is presented to the cam follower of arm 172. As a result, a low secondary comparison impulse will be transmitted from hub 239 (Fig. 15*a*) via a circuit to be described in detail hereinafter.

It is to be observed that a circuit through the contact slug in engagement with the camming commutator segment 125 during the 0–1 test, is precluded by the simultaneous energization of relay R32 and deenergization of relay R34.

*Special character 8–3 and 8–4 test.*—Assume that the card SC being read at the secondary reading station has combinational X–8–3 holes punched in column 1, and the card PC being read at the primary reading station has combinational R–9 holes punched therein. It is believed unnecessary to explain once again the operation of the comparing control units, whereby after R-time, the comparing control unit associated with the primary feed is set to indicate a low primary condition. However, as mentioned hereinbefore, any columnar card data having an 8–3 or an 8–4 in combination therewith, indicates a special character which is low when compared to alphabetic or numeric data.

After the 0–1 special character test is completed, cam contacts CR7 (Fig. 15*a*) close at 285° for the first time in a card cycle to test for any 8–3 or 8–4 character combinations through the following circuit:

The +40 volt line 217 (Fig. 15*a*), through cam contact CR7, commutator segment 122 via wire 242 (Fig. 15*b*), contact slug 109 which was unlatched at 3-time due to the 3 hole in card SC, the contact slug common frame, commutator segment 123 via the contact slug 109 which was unlatched at 8-time due to the 8 hole in card SC, relay contacts R34–1 n/c, R32–1 n/o, control unit coils 175 and 177, to the other side of the line via wire 238.

The energization of control unit coils 175 and 177 at this time causes a low secondary comparison impulse to be transmitted to hub 239 (Fig. 15*e*), through a circuit to be described hereinafter, because transfer wire 207 (Fig. 10) is shifted to engage contact 209. It is to be observed that the same test circuit is established in the event an 8–4 combination exists because, at the time of this special character test, a contact slug unlatched at either 3-time or at 4-time will engage commutator segment 122.

OPERATION AND REMAINING CIRCUITS

The machine is capable of a diversity of operations. For purposes of this disclosure, one particular mode of operation, which is usually termed match-merging, will be described. A card in one feed is said to match a card in the other feed, when their control values are equal. In the match-merging operation to be described, unmatched primary cards PC will be directed to stacker pocket SP1 (Fig. 1), matched primary cards PC will be directed to pocket SP2, matched secondary cards SC to pocket SP3, and unmatched secondary cards SC to pocket SP4. Moreover, should the cards in the primary feed be out of sequence, in ascending order, operation of the machine will be interrupted, and a signal lamp will be lighted to designate the same.

The primary feed and secondary feed clutches latch at 350° (see Fig. 17) so that during an idle feed cycle, the S and P cams are maintained at a 350° setting.

There are various sequences of primary cards which may be sought. Ordinarily, the desired sequence is one in which successively fed primary cards have equal or higher sequence or group control values than the preceding primary cards. As mentioned hereinbefore, the number of card columns that may be compared simultaneously is determined by the number of storage and comparing control positions. In order, once again, to avoid undue prolixity, the circuits relating to only one card column will be described.

The secondary reading station card column 1 brush hub 232 (Fig. 15*a*) is plug wired to storage and control hub 230 (Fig. 15*b*). Similarly, primary reading station card column 1 brush hub 233 (Fig. 15*a*) is connected by plug wire to storage and control hub 231 (Fig. 15*b*), and to storage and control hub 260 (Fig. 15*c*). The sequence reading station column 1 brush hub 234 (Fig. 15*a*) is plug wired to storage and control hub 261 (Fig. 15*c*). Hence, the circuitry shown in Fig. 15*b* will be used for cross-feed comparing, and the circuitry shown in Fig. 15*c* will be used for primary sequence comparing. For the purposes of this description, it will be assumed that the following group of primary cards PC are to be compared with the following group of secondary cards SC (see Fig. 16*a*):

*Primary cards.*—R, R–1, 2, 3, 6 and 5.

*Secondary cards.*—R–8–3, R–1, R–2, 4 and 7.

As described in General Circuits Description, to start operations, the start key (Fig. 15*d*) is depressed. Relay R17 thereby is energized. Contacts R17–2 (Fig. 15*e*) close, and circuits of clutch magnets 62, 63 and 65 are then established. Primary and secondary cycles ensue, during which the first cards are fed out of the hoppers PH and SH (Fig. 1) to positions behind the sequence and secondary stations, respectively (see Fig. 16*b*).

The start key (Fig. 15*d*) is held down, whereby relay R17 is maintained energized. The second primary and secondary cycles ensue, during which the first cards are fed through the sequence and secondary stations, respectively, while the next cards are fed from the hoppers (see Fig. 16*c*). Relays R5, R7, R8, R9, R14 and R15, are energized, as was described previously. Contacts R7–3 (Fig. 15*a*) shift, enabling the first primary card to be analyzed as it feeds through the sequence station. Thus, at R-time, i.e., 261°, an impulse to energize concurrently storage coil 262 (Fig. 15*c*) and control coils 263 and 264 is transmitted through the following circuit:

*Sequence reading circuit.*—The +40 volt line 217 (Fig. 15*a*), cam contacts CR6, CB1 or CB2 and CB3 or CB4, relay contacts R7–3 via wire 235, sequence station contact roll QC, column 1 sequence reading brush QB to hub 234, the aforementioned plug wire connecting hubs 234 and 261 (Fig. 15*c*), relay contacts R30–3, R33–2 n/c comparison control coils 263 and 264, to the other side of the line via wire 238.

A parallel circuit is effective to energize storage coil 262 via contacts R32–3 n/c. The energization of storage coil 262 causes the release of a contact slug (not shown), similar in all respects to slug 109 (Fig. 4), from a latch spring (not shown), similar to spring 92, whereupon this contact slug is moved radially to successively engage the commutator segments 268 to 273 (Fig. 15*c*), respectively, during the subsequent rotation of the wheel assembly. The energization of control coils 263 and 264 unlatches a related wire contact operating arm, similar to arm 172 (Fig. 10), as described hereinbefore. The contact straps 207–209 controlled thereby are also shown as 207′–209′ in Fig. 15*f*.

Contacts R5–3 (Fig. 15*a*) close, whereby the first secondary card SC is analyzed as it traverses the secondary station. In view of the fact that the first secondary card has combinational R–8–3 holes punched in column 1, correspondingly timed impulses are transmitted from secondary reading brush hub 232 to storage and control hub 230 (Fig. 15*b*) in order to energize concurrently storage coil 135 and comparing coils 175 and 177 at 36°, 148½° and 261°. As described hereinbefore, the said impulses cause three contact slugs 109 to unlatch, whereupon the same successively engage commutator segments 120 to 125 during the rotation of the storage wheel assembly. The energization of control coils 175 and 177 unlatches the related operating arm 172 (Fig. 10). At this time, i.e., during the second primary and secondary card feed cycles, relay contacts R6–3 (Fig. 15*a*) are in normal status, so that the primary station reading circuits cannot form yet. Accordingly, there is present at the primary station the equivalent of a blank card.

Figure 16A:
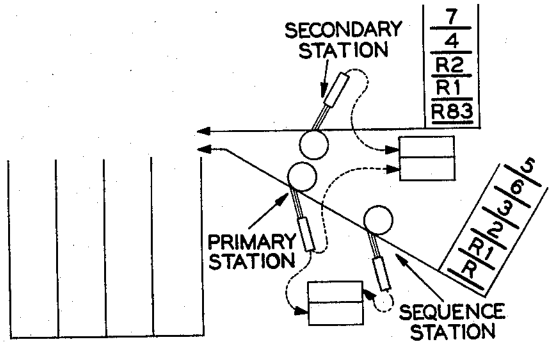
Figures 16B, 16C:
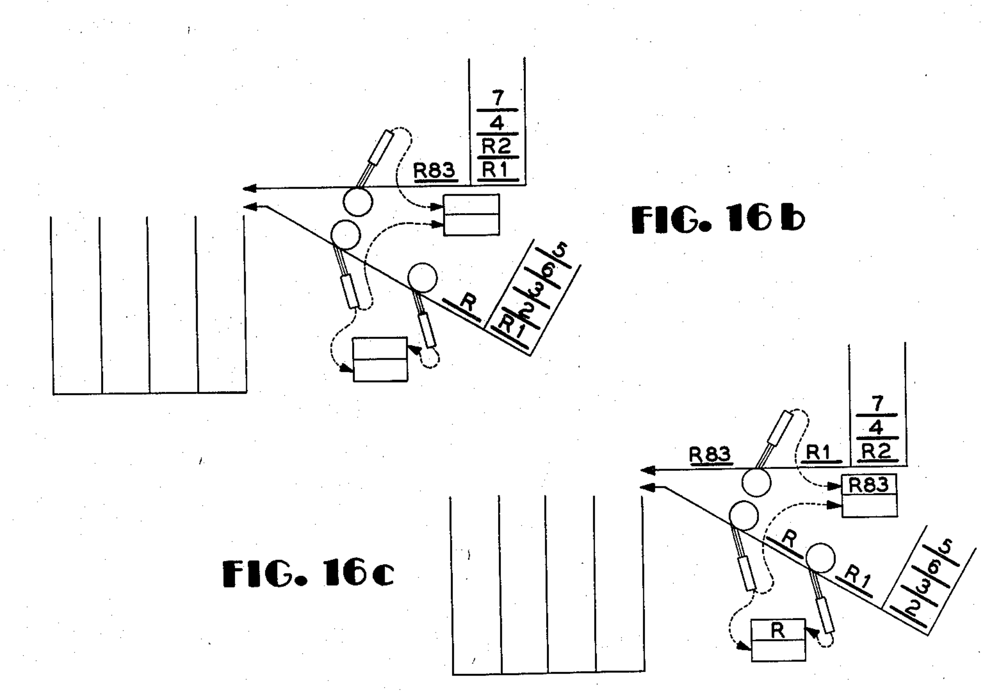
Figure 16D:
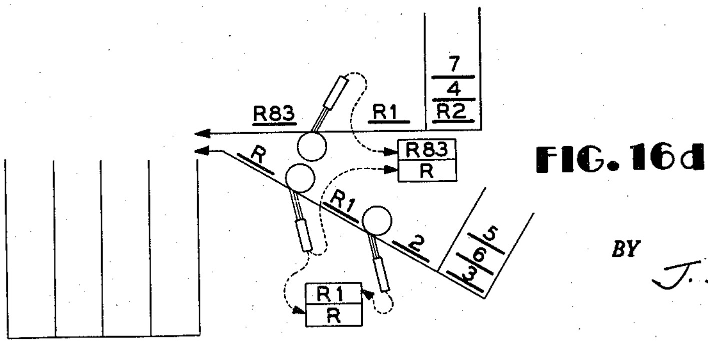

With the start key held down to maintain start relay R17 (Fig. 15*d*) energized, a third primary cycle is performed for the reasons indicated previously in General Circuits Description (see Fig. 16*d*). Thereafter, the start relay will be retained in energized status, and the start key may be released. As mentioned hereinbefore, there is no circuit which may be closed at this time to the secondary feed clutch magnet 62 (Fig. 15*e*). Consequently, the first secondary card remains at the eject position. During the third primary cycle, the first primary card PC feeds through the primary station and the second primary card PC traverses the sequence station. Before the reading period starts, relay R6 (Fig. 15*d*) is energized, subsequently followed by operation of relays R12 and R13, as described in General Circuits Description. Relay contacts R6–3 (Fig. 15*a*) shift, enabling the first primary card to be analyzed as it travels through the primary station. Accordingly, in view of the fact that the first primary card has an R hole punched therein, a correspondingly timed impulse will be transmitted from primary reading brush hub 233 to storage and control hub 231 (Fig. 15*b*), whereupon storage coil 134 and control coils 174 and 176 are energized concurrently as described hereinbefore. In view of the fact that hub 233 (Fig. 15*a*) is also connected by plug wire to storage and control hub 260 (Fig. 15*c*), the aforesaid impulse will also cause storage coil 265 and control coils 266 and 267 to become energized through contacts R30–4, R33–4 n/c and R32–7. During the third primary feed cycle, the second primary card having combinational R–1 holes punched in column 1, is analyzed at the sequence reading station. Consequently, at R-time (261°) and at 1-time (193½°), an electrical impulse is transmitted from sequence reading brush hub 234 (Fig. 15*a*) to storage and control hub 261 (Fig. 15*c*), thereby energizing concurrently storage coil 262 and control coils 263 and 264.

Thus, at the completion of the reading portion of the third primary cycle (see Fig. 16*d*), the sequence storage unit controlled by storage coil 262 (Fig. 15*c*) will have contact slugs representing an R hole and a 1 hole, unlatched; the primary sequence storage unit controlled by storage coil 265 will have a contact slug representing an R hole, unlatched; the primary storage unit controlled by storage coil 134 (Fig. 15*b*) will also have a contact slug representing an R hole, unlatched; and the secondary storage unit controlled by storage coil 135 will have contact slugs representing an R hole, and 8 hole, and a 3 hole, unlatched. That is, the sequence storage unit will have the alphabetic letter A stored therein; the primary and primary sequence storage units each will have the special character "&" (Fig. 8) stored therein; and the secondary storage unit will have the special character "." (period) stored therein. In brief, a low primary-high sequence condition is said to exist.

When cam contacts CR7 (Fig. 15*a*) close at 285°, the special character 8–3 and 8–4 test, described previously, to determine the presence of 8–3 and 8–4 combination characters, is made. Due to the fact that the secondary storage unit coil 135 (Fig. 15*b*) was energized by 8–3 character impulses, control coils 175 and 177 will be energized concurrently during this test through the following circuits:

The +40 volt line 217 (Fig. 15*a*), through cam contacts CR7 at 285°, commutator segment 122 (Fig. 15*b*) via wire 242, the contact slug 109 that was unlatched at 3-time (148½°), the contact slug common frame, commutator segment 123 via the contact slug 109 that was unlatched at 8-time (36°), relay contacts R34–1 n/c, R32–1 n/o, control coils 175 and 177, to the other side of the line via wire 238.

At 298° when cam contacts CR7 (Fig. 15*a*) close for the second time in a machine cycle, the hereinbefore described special character R–X test is made. In view of the fact that both the primary and primary sequence storage units each have the special character R stored therein, their respective control coils 174 and 176 (Fig. 15*b*), and 266 and 267 (Fig. 15*c*) are energized concurrently via circuits described previously.

To summarize the foregoing, after the reading portion and the special character tests of the third primary card cycle are completed, the cross-feed compare control mechanism shown in Figs. 9 and 10, the circuits for which are shown in Fig. 15*b*, will be set to indicate a low primary condition because the energization of compare coils 174 (Fig. 15*b*) and 176 during the special character R test resulted in the unlatching of operating arm 170. As described previously, this permits transfer wire 191 to engage contact 193, whereupon a low primary comparison signal is effected. The primary feed sequence compare control mechanism, the circuits for which are shown in Fig. 15*c*, will be set after the reading portion and the special character tests of the third primary card cycle to indicate a high sequence condition because the energization of compare coils 266 and 267 during the special character R test resulted in the unlatching of the transfer wire operating arm (not shown) similar to arm 170 (Fig. 9).

Accordingly, when the low dwells of the cams engage the cam followers of these operating arms (see Fig. 17), only those transfer wires whose operating arms are unlatched, will shift. That is, wire 191 (Fig. 9) of switch PS (Fig. 15*e*) will engage contact 193, and wire 191' (Fig. 15*f*) of switch PQS will engage contact 193'. Hence when cam contacts CR15 (Fig. 15*e*) close at 325°, the following circuits will form prior to a fourth primary card cycle:

(1) *Primary select magnet.*—The +40 volt line 217 (Fig. 15*e*), through cam contacts CR15, contacts R17–4 and HS4–2, transfer wire 207 and contact 208, transfer wire 191 and contact 193 now engaged, the plug wire connecting low primary hub 241 and hub 274, primary select magnet 66, to the other side of the line. It is to be observed that parallel circuit are effective to energize latch pick relay coil R53LP and relay R31.

(2) *Sequence comparison.*—The +40 volt line 217, through cam contacts CR15, contacts R17–4 and HS4–2, transfer wire 207' (Fig. 15*f*) and contact 208' via wire 275, transfer wire 191' and contact 193' now engaged, relay coil R56LP, to line 218.

(3) *Primary card feed circuit No. 2.*—Referring to Fig. 15*e*, the primary clutch feed magnet circuit is formed at 331° through the +40 volt line 217, cam contacts CR3, relay contacts R17–2, HS4–1, R53–1, the plug wire connecting hubs 276 and 277, relay contacts R2–2, primary clutch feed magnet coil 63, to the other side of the line.

(4) *Eject magnet circuit No. 2.*—The +40 volt line 217, through cam contacts CR3, relay contacts R17–2, HS4–1, HS3–1, eject magnet coil 65, to the other side of the line.

Figure 15F:
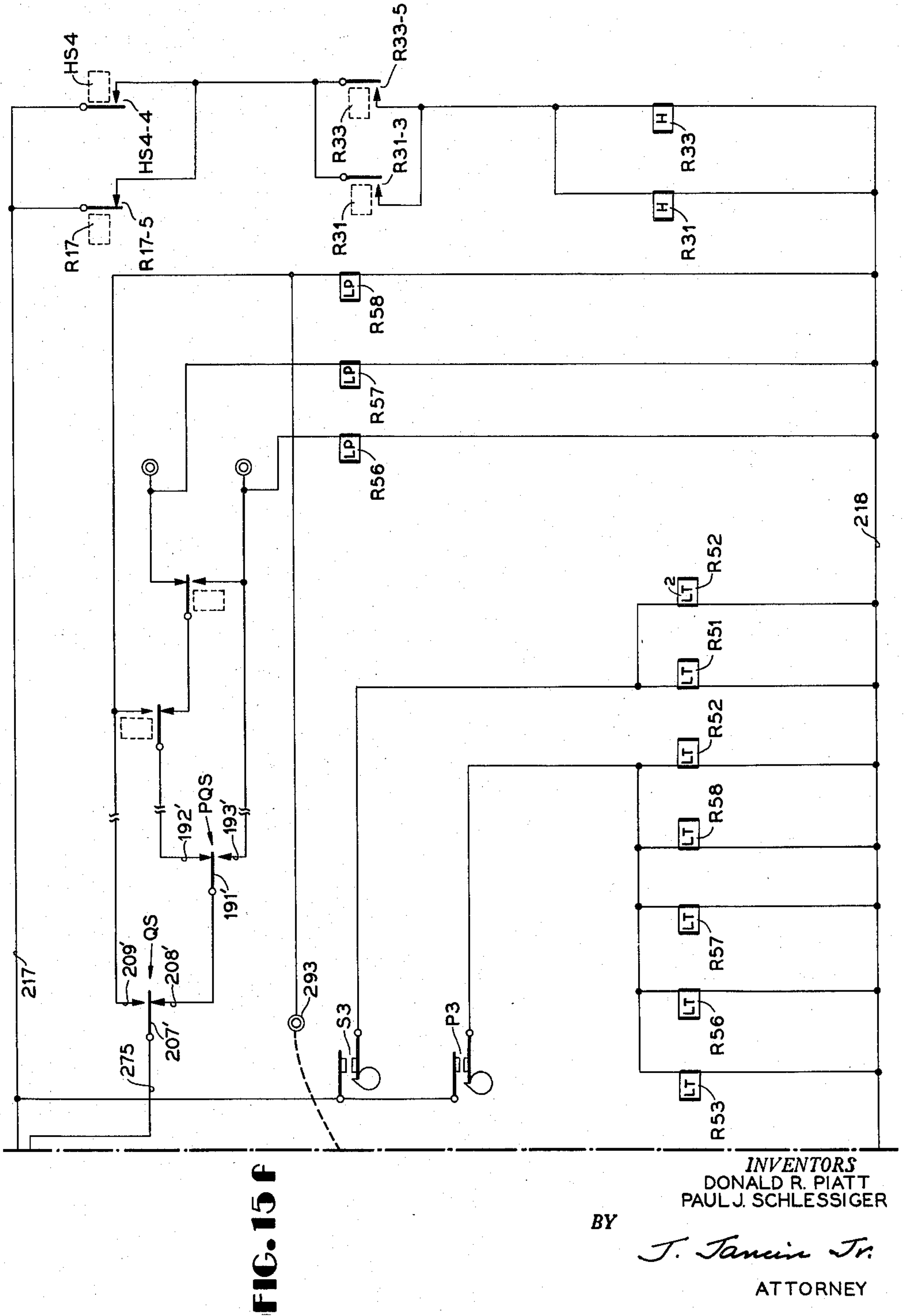
Figure 16E:
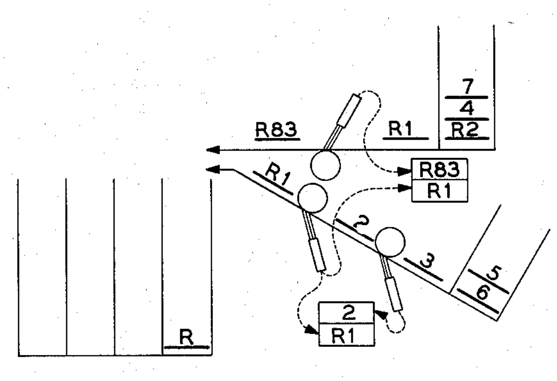
Figures 16F, 16G:
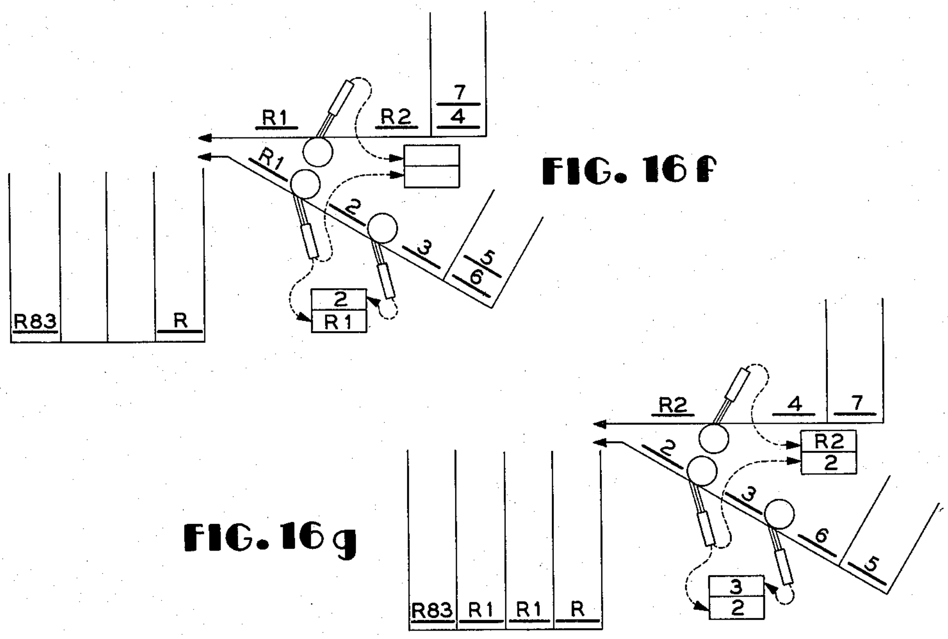
Figure 16H:
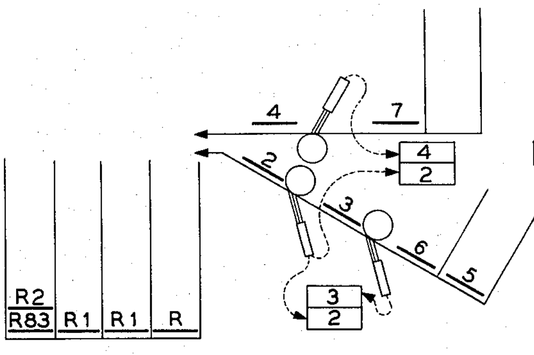

In view of the foregoing, a fourth primary card feed cycle will ensue (see Fig. 16*e*). Due to the fact that primary pocket select magnet 66 and eject magnet 65 are energized, the first primary card PC is fed into stacker pocket SP1 during the fourth primary feed cycle. In addition thereto, during the fourth primary feed cycle, the second primary card PC is advanced through the primary station, and the third primary card PC is moved through the sequence station. At 9° of the fourth primary card feed cycle, cam contacts P3 (Fig. 15*f*) close to energize latch trip coils R53LT and R56LT, whereupon their respective contacts are returned to a normal position.

Since the secondary feed clutch magnet 62 was not energized, the first secondary card SC will remain at the eject position in the secondary feed. However, in order to afford a cross-feed comparison between the first secondary card SC and the second primary card PC, it is necessary to retain in the secondary storage unit the data read during the time the first secondary card was fed past the secondary reading station. That is, it is necessary to recirculate the data within a storage unit once each card feed cycle so long as the card associated with the said storage unit is not advanced in the feed.

*Storage data recirculation.*—It is to be recalled that relay R31 (Fig. 15*e*) was energized along with relay R53LP and magnet 66. Relay R31 is held through its own stick points and cam contacts CR16 through the card reading portion of the following card feed cycle (see Fig. 17). As is shown in Fig. 5, and as has been described previously, each storage unit wheel assembly includes 18 equally spaced contact slugs which revolve at a speed such that only 16 contact slugs pass any one given point, for example operating member 141, during a single machine cycle.

In line with the foregoing, and as a result of unlatching contact slugs 109 (Fig. 15*b*) at 8, 3 and R-times of the second secondary card cycle, at 8-time of the fourth primary card feed cycle, the contact slug which was unlatched at 8-time of the second secondary feed cycle, will engage commutator segment 124 to complete the following circuit:

*Secondary data recirculation circuit.*—The +40 volt line 217 (Fig. 15*a*), through cam contacts CR17, relay contacts R31–2, commutator segment 124 (Fig. 15*b*) via wire 278, the aforementioned unlatched contact slug, the contact slug common frame, commutator camming segment 125, relay contacts R32–4, R31–1 n/o via wire 279, R32–1 n/c, storage coil 135, to the other side of the line via wire 238.

A parallel circuit is effective to also energize control coils 175 and 177 at precisely the same time storage coil 135 is energized. Similarly, at 3-time of the fourth primary feed cycle, the contact slug 109 which was unlatched at 3-time of the second secondary feed cycle will engage commutator segment 124, and the aforedescribed secondary recirculation circuit will be completed to energize concurrently storage coil 135 and control coils 175 and 177. At R-time of the fourth primary feed cycle, the aforedescribed recirculation circuit will be completed to again energize concurrently coils 135, 175 and 177.

At the completion of the fourth primary feed cycle, the secondary unit will still have a combinational R–8–3 special character stored therein; the primary and primary sequence units will each have the alphabetic letter A stored therein; and the sequence unit will have a numeric 2 value stored therein. That is, a low secondary-high sequence condition is said to exist. Accordingly, at 325° of the fourth primary feed cycle when cam contacts CR15 close, latch pick relay R51LP (Fig. 15*e*) and relay R33, and secondary pocket select magnet 68, are energized concurrently via the following parallel circuits because the special character represented by R–8–3 stored in the secondary storage unit is low when compared to the alphabetic letter A stored in the primary unit:

The +40 volt line 217 (Fig. 15*e*), through cam contacts CR15, relay contacts R17–4, HS4–2, transfer wire 207 now engaged with contact 209, the plug wire connecting hubs 239 and 250, magnet 68, to the other side of the line.

As is shown, parallel circuits are effective to energize relays R33 and R51LP. Relay R33 is held through its own stick points and cam contacts CR16 through the card reading portion of the following card feed cycle (see Fig. 17).

In addition thereto, relay R56LP (Fig. 15*f*) will also be energized because of a high sequence condition; i.e., the numeric 2 in the sequence storage unit is high as compared to the alphabetic letter A in the primary unit. Hence, secondary feed clutch magnet 62 is energized at 331° via the following circuit to feed the first secondary card SC into pocket SP4 (due to the energization of magnet 68), and the second secondary card SC past the secondary reading station (see Fig. 16*f*):

*Secondary feed circuit No. 2.*—The +40 volt line 217 (Fig. 15*e*), through cam contacts CR3, relay contacts R17–2, HS4–1, R51–1, the plug wire connecting hubs 280 and 281, R9–1 n/o, secondary feed clutch magnet 62, to the other side of the line.

This causes the third secondary feed cycle during which the second secondary card SC is fed past the secondary reading station and the alphabetic letter A is stored in the secondary storage unit. Referring to Fig. 15*f*, latch trip relay coil R51LT is energized when cam contacts S3 close at 9° of the third secondary feed cycle. Relay R56 remains picked, however, because R56LT is not energized during this secondary feed cycle. It is to be recalled that cam contacts P3 operate only during primary feed cycles.

As only the secondary feed mechanism is operative during the third secondary feed cycle, it is necessary to retain the data stored in the primary, primary sequence, and sequence storage units during this feed cycle. This is accomplished through the following storage data recirculation circuits:

(1) *Primary data recirculation.*—As the primary storage unit had an R–1 entered therein during the fourth primary feed cycle, at 1-time of the third secondary feed cycle an impulse is transmitted from the +40 volt line 217 (Fig. 15*a*), through cam contacts CR17, relay contacts R33–3, commutator segment 248 (Fig. 15*b*) via wire 282, the contact slug 110 which was unlatched at 1-time during the fourth primary feed cycle, the contact slug common frame, camming commutator segment 249, relay contacts R32–5, R33–1 n/o via wire 289, control coils 174 and 176, to the other side of the line via wire 238. A parallel circuit through contacts R32–2 n/o is effective to energize storage coil 134. In a similar fashion, storage coil 134 and control coils 174 and 176 are energized concurrently at R–time of the third secondary card feed cycle.

(2) *Primary sequence data recirculation.*—As the primary sequence storage unit also had an R–1 entered therein during the fourth primary feed cycle, at 1-time of the third secondary feed cycle an impulse is transmitted from the +40 volt line 217 (Fig. 15*a*), through cam contacts CR17, relay contacts R33–3, commutator segment 287 (Fig. 15*c*) via wire 282, the contact slug which was unlatched at 1-time of the fourth primary feed cycle, the contact slug common frame, camming commutator segment 288, relay contacts R32–6, R33–4 n/o via wire 251, control coils 266 and 267, to the other side of the line via wire 238. A parallel circuit through contacts R32–7 n/c is effective to energize storage coil 265. Via similar circuitry, storage coil 265 and control coils 266 and 267 are energized concurrently at R-time of the third secondary card cycle.

(3) *Sequence data recirculation.*—As the sequence unit had a numeric 2 value entered therein during the fourth primary feed cycle, at 2-time of the third secondary feed cycle, an impulse is transmitted from the +40 volt line 217 (Fig. 15*a*), through cam contacts CR17, relay contacts R33–3, commutator segment 272 (Fig. 15*c*) via wires 282 and 252, the contact slug that was unlatched at 2-time of the fourth primary cycle, the contact slug common frame, camming commutator segment 273, relay contacts R32–8, R33–2 n/o via wire 290, control coils 263 and 264, to the other side of the line via wire 238. A parallel circuit through relay contacts R32–3 n/c is effective to energize storage coil 262.

When cam contacts CR15 (Fig. 15*e*) close at 325° of the third secondary card cycle, an equal comparison impulse is effective to energize secondary pocket select magnet 67 and latch pick relay R52LP via the following circuit because the alphabetic letter A is stored in the primary and secondary storage units:

The +40 volt line 217 (Fig. 15*e*), through cam contacts CR15, relay contacts R17–4, HS4–2, transfer wire 207 and contact 208, transfer wire 191 and contact 192, the secondary comprison switches SS and primary comparison switches PS connected in tandem and associated with lower denomination storage units not used for the instant description, magnet 67 via the plug wire connecting hubs 240 and 253, to the other side of the line.

Relay R56LP (Fig. 15*f*) is also energized at this time through a circuit described previously due to the high sequence condition. In view of the foregoing, an equal primary-secondary, high sequence condition is said to exist. Energization of the aforesaid relays will cause the primary feed clutch magnet 62 (Fig. 15*e*) and the secondary feed clutch magnet 63 to become energized concurrently in order to effect simultaneous primary and secondary card feed cycles (see Fig. 16*g*):

*Secondary feed clutch magnet circuit No. 3.*—The +40 volt line 217 (Fig. 15*e*), through cam contacts CR3, relay contacts R17–2, HS4–1, R52–1, R57–1, R56–1, the plug wire connecting hubs 280 and 281, R9–1 n/o, clutch magnet 62, to the other side of the line.

*Primary feed clutch magnet circuit No. 3.*—The +40 volt line 217, through cam contacts CR3, relay contacts R17–2, HS4–1, R52–2, the plug wire connecting hubs 291 and 292, the plug wire connecting hubs 276 and 277, contacts R2–2, primary clutch magnet 63, to the other side of the line.

Eject magnet 65 is also energized at this time through a circuit described previously. Thus, the second primary card PC is fed into pocket SP2, whereas the second secondary card SC is fed into pocket SP3 because of the energization of pocket select magnet 67. It is to be recalled that when magnet 66 is not energized, a card in the primary feed is advanced to pocket SP2.

Figure 16I:
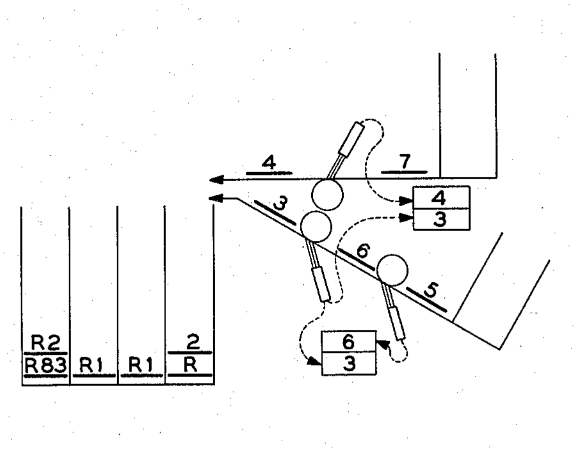
Figure 16J:
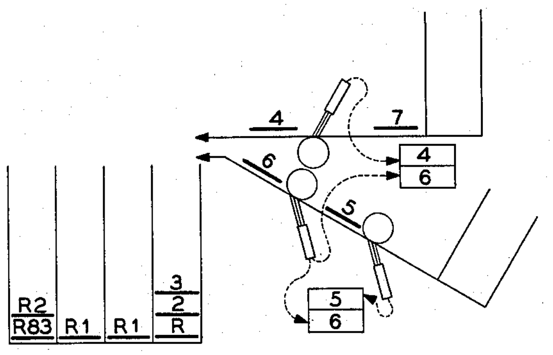

During the fifth primary card feed cycle (see Fig. 16*g*), the third primary card PC having a 2 hole punched therein is moved past the primary reading station and the fourth primary card PC having a 3 hole punched therein is advanced past the sequence reading station. During the fourth secondary feed cycle which is simultaneous with the fifth primary feed cycle, the third secondary card SC having the alphabetic letter B punched therein, is fed past the second reading station. At the completion of the aforesaid simultaneous primary and secondary feed cycles, the secondary storage unit will have an R and a 2 (alphabetic letter B) stored therein; the primary and primary sequence storage units will each have the numeral 2 stored therein; and the sequence storage unit will have the numeral 3 stored therein. Hence, when cam contacts CR15 close again at 325°, relays R51LP and R33, and pocket select magnet 68, will be energized to indicate the low secondary cross-feed condition; and relay R56LP (Fig. 15*f*) will be energized to indicate the high sequence condition. As a result, secondary feed clutch magnet 62 (Fig. 15*e*) will be energized in order to effect the fifth secondary feed cycle (see Fig. 16*h*) during which the fourth secondary card SC having a 4 hole (see Fig. 16) punched therein is fed past the secondary reading station and the third secondary card is ejected into stacker pocket SP4. The numeral 2 is retained in the primary and primary sequence storage units during the fifth secondary card cycle in a manner hereinbefore described, as is the numeral 3 retained in the sequence storage unit. Consequently, at the completion of the fifth secondary card feed cycle, the secondary storage unit will have a numeric 4 value stored therein, the primary and primary sequence storage units will each have a numeric 2 value stored therein; and the sequence storage unit will have a numeric 3 value stored therein. This low primary-high sequence condition will normally cause the sixth primary card feed cycle during which the fourth primary card PC having a 3 punched therein feeds past the primary reading station and the fifth primary card PC having a 6 punched therein feeds past the sequence station (Fig. 16*i*).

However, the machine will stop feeding cards at the end of the fifth secondary feed cycle because the last secondary card SC having a 7 hole therein, is moved out of the secondary feed hopper SH, whereupon the secondary hopper contacts 70 (Fig. 15*d*) close to energize the secondary hopper relays R3 and R4. This results in the transfer of contacts R3–2 which open the test circuit to relay R17H when cam contacts CR1 close at 168°. This, in turn, prevents the completion of the feed clutch circuits when cam contacts CR3 (Fig. 15*e*) close at 331° because of open contacts R17–2. It is then necessary to depress the runout key (Fig. 15*d*) in order to pick up start relay R17, and it is necessary to hold the runout key down until the cards have completely left the secondary feed at which time relay coil R17H will remain energized through cam contacts CR1, stop key contacts 220, relay contacts R35–1, R13–3 n/o, R15–2, R1–2 n/c, R9–2 n/c, R1–3, R3–2 n/o, safety contacts 226, and relay contacts R17–3.

*Idle machine cycles.*—After the fifth secondary card feed cycle and prior to the closure of the runout key contacts, any number of idle machine cycles takes place. During these idle machine cycles, cards are not fed in either of the two card feed units. It is necessary, however, to recirculate the data in each of the storage units in order to retain the denominational values read into the secondary storage unit and recirculated in the primary, primary sequence, and sequence storage units, during the fifth secondary feed cycle.

As stated previously, the wheel assembly of each storage unit rotates continuously due to the continuous rotation of shaft 34 (Fig. 2). Inasmuch as a low primary-high sequence condition exists at the completion of the fifth secondary feed cycle, relays R53LP (Fig. 15*e*), R31 and R56LP (Fig. 15*f*), and primary pocket select magnet 66 (Fig. 15*e*), are energized concurrently when cam contacts CR15 make at 325°. The closure of contacts R17–5 (Fig. 15*f*) maintains relay R31 picked, and causes relay R33 to pick when R31H and R33H are energized concurrently through contacts R31–3. It should be apparent at this time, that relays R31 and R33 must be up during the period that relay R17 is de-energized in order to retain the denominational values read into the secondary storage unit and retained in the primary, primary sequence and sequence storage units during the fifth secondary feed cycle. This, then, permits the storage unit data to be recirculated via circuits including contacts CR17 (Fig. 15*a*), R31–2 and R33–2, and described hereinbefore. In view of the de-energization of relay R17, however, the feed clutch magnets 62 (Fig. 15*e*), 63 and 65 are not energized. Of course, when the runout key (Fig. 15*d*) is depressed in order to pick relay R17, the closure of contacts R17–2 (Fig. 15*e*) allows the completion of the feed clutch magnet circuits.

Hence, when the runout key (Fig. 15*d*) is depressed, start relay R17 will pick at 168° when cam contacts CR1 close, and contacts R17–5 (Fig. 15*f*) will open, whereupon relays R31H and R33H de-energize. Relays R31 (Fig. 15*e*) and R33 will remain picked, however, through their respective stick points until cam contacts CR16 (Fig. 15*e*) open at 272°. At 325°, an impulse is transmitted through cam contacts CR15 and relay contacts R17–4 in order to energize latch pick relays R53LP and R56LP (Fig. 15*f*), and relay R31 (Fig. 15*e*). Consequently, when cam contacts CR3 close at 331°, the following primary feed clutch magnet circuit is formed:

*Primary feed clutch magnet circuit No. 4.*—The +40 volt line 217, through cam contacts CR3, relay contacts R17–2, HS4–1, R53–2, the plug wire connecting hubs 291 and 292, the plug wire connecting hubs 276 and 277, contacts R2–2, magnet 63, to the other side of the line.

The eject clutch magnet 65 is also energized, whereupon the third primary card PC having a 2 hole therein (see Fig. 16*i*) is fed into pocket SP1, the fourth primary card is fed past the primary reading station, and the fifth primary card is fed past the sequence reading station. In addition thereto, latch trip coils R53LT (Fig. 15*f*), and R56LT are energized at 9° through cam contacts P3 in order to drop out their respective relays. The secondary storage unit has a numeric 4 value recirculated therein during the sixth primary feed cycle because relay R31 is energized by an impulse through contacts CR15 after relay R17 is repicked.

At the completion of the sixth primary card feed cycle, the primary and primary sequence storage units will each have a numeric 3 value stored therein, the sequence storage unit will have a numeric 6 value stored therein, and the secondary storage unit will have a numeric 4 value therein. In addition thereto, the primary hopper relays R1 and R2 are energized when the sixth primary card PC having a 5 hole therein (see Fig. 16*i*) is fed out of primary hopper PH.

Continued depression of the runout key maintains start relay R17 picked so that when cam contacts CR3 (Fig. 15*e*) close at 331°, a seventh primary feed cycle will ensue (see Fig. 16*h*), whereupon the fourth primary card having a 3 hole (see Fig. 16) therein is fed into stacker pocket SP1, the fifth primary card having a 6 hole is fed past the primary reading station, and the sixth primary card having a 5 hole punched therein is fed past the sequence reading station. Accordingly, at the completion of this card feed cycle, the secondary storage unit will have a numeric 4 value stored therein (due to data recirculation, once again), the primary and primary sequence units each will have a numeric 6 value stored therein, and the sequence storage unit will have a numeric 5 value therein. That is, a low secondary-low sequence condition is said to exist.

The low sequence condition causes latch type relay R58LP (Fig. 15*f*) and high speed relay HS4 to pick through the following circuits when cam contacts CR15 (Fig. 15*e*) close at 325° of the seventh primary feed cycle:

*Relay R58 pick.*—The +40 volt line 217, through cam contacts CR15, relay contacts R17–4, transfer wire 207′ (Fig. 15*f*) and contact 209′, now engaged, via wire 275, relay R58LP, to the other side of the line.

*Relay HS4 pick.*—The +40 volt line 217 (*Fig.* 15*e*), through cam contacts CR15, relay contacts R17–4, transfer wire 207′ and contact 209′ (Fig. 15*f*), now engaged, via wire 275, the plug wire connecting hubs 293 and 294 (Fig. 15*e*), contacts R34–5, relay coil HS4P, to the other side of the line.

A parallel circuit to coil HS4H through contacts R34–6 and HS4–3 is effective to energize lamp 254 which, when lighted, indicates a low sequence condition in the primary feed to the machine operator.

The circuits to the secondary and primary feed clutch magnets 62 and 63, respectively, and the eject magnet 65, are opened when contacts HS4–1 separate. Accordingly, the cards in both feeds will remain at rest at the end of the seventh primary feed cycle during which the low sequence condition was detected.

At precisely the same time that relays R58LP (Fig. 15*f*) and HS4 (Fig. 15*e*) are picked, relays R51LP and R33, and pocket select magnet 68, are energized through the low secondary cross-feed compare circuit previously described. It is to be observed that contacts HS4–4 (Fig. 15*f*) shunt contacts R17–5 in order to energize concurrently relays R31H and R33H. It is unnecessary to have a hold circuit for pocket select magnets 66, 67, or 68 because they are restored mechanically only during a related card feed cycle.

During the interval of time that the cards PC and SC are at rest in each of their respective feeds as a result of the low sequence condition, provision is made to retain the data in all storage units. This is accomplished as a result of contacts HS4-4 (Fig. 15*f*) and in the same manner that it was accomplished through the action of contacts R17-5 when start relay R17 dropped out due to the absence of secondary cards in the secondary hopper SH. Thus, for each idle machine cycle during which the cards are at rest as a result of the low sequence condition, the numeric 4 value will be re-entered at 4-time into the secondary storage unit, the value 6 will be re-entered at 6-time into the primary and primary sequence units, and the numeral value 5 will be re-entered at 5-time into the sequence storage unit.

To bring the feed clutch magnets into operation again, the error release key having contacts 295 (Fig. 15*e*) is depressed, thereby establishing the circuit of relay R34 through cam contacts CR18 at 168°. Relay R34 is held through its stick contacts and primary cam contacts P4. Relay R34, when energized, opens contacts R34-5 and R34-6, thereupon de-energizing relay HS4 and extinguishing lamp 253. Due to the fact that relay R34 is held through cam contacts P4, and since contacts R34-5 are connected in series circuit with relay coil HS4P, relay HS4 cannot pick again until, at least, a following primary feed cycle. The dropout of relay HS4 causes the de-energization coils of R31H (Fig. 15*f*) and R33H when contacts HS4-4 separate. Relays R31 and R33 (Fig. 15*e*) will remain picked, however, through their own stick points until 272° when cam contacts CR16 open.

After contacts HS4-1 and HS4-2 close at 168°, an impulse is transmitted through cam contacts CR15 to energize relays R31, R51LP and R58LP (Fig. 15*f*). Relay HS4 (Fig. 15*e*) does not pick again, at this time, due to open contacts R34-5. The closure of contacts HS4-1 reconnects the feed clutch magnet circuits to the +40 volt line 217.

It may be seen that after the sixth primary card PC having a 5 hole therein, feeds past the sequence reading station (Fig. 16*j*), the primary card lever 73 (Fig. 1) is released due to the absence of succeeding primary cards, whereupon the primary card lever contacts 74 (Fig. 15*d*) open to de-energize relay R7. Hence, after the error release key is depressed to de-energize relay HS4 as hereinbefore described, and the runout key is depressed to energize start relay R17, a circuit will be formed to effect a secondary feed cycle.

Figure 16K:
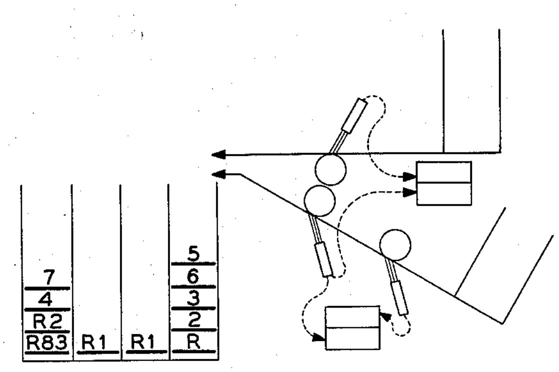

It should be mentioned, at this time, that after a low sequence condition occurs, the machine operator usually removes the primary and secondary cards from their respective hoppers PH and SH (Fig. 1), in order to run out those primary and secondary cards which are in the feeds (see Fig. 16*k*). This affords an opportunity to the machine operator whereby he may manually correct the out of sequence condition and start machine operations anew.

Referring to Fig. 15*a*, it may be seen that during the runout of cards in either feed, a 9-timed impulse is automatically entered at the reading station through which a card does not pass. For example, during primary feed runout, contacts R2-3 are closed as a result of the closure of primary hopper contacts 69 (Fig. 15*d*). In addition, the separation of primary card lever contacts 74 (Fig. 15*d*) causes the de-energization of relay R7, whereupon contacts R7-3 (Fig. 15*a*) are returned to a normal status. Consequently, when primary cam contacts P1 close at 9-time, a correspondingly timed impulse is transmitted through cam contacts P1, relay contacts R2-3, R7-3 n/c, to sequence station brush hub 234. Similarly, when a primary card is absent at the primary reading station, the separation of primary card lever contacts 76 (Fig. 15*d*) causes contacts R6-3 (Fig. 15*a*) to return to a normal status, whereupon a 9-timed impulse is automatically read at the primary reading station. The absence of secondary cards in the secondary hopper causes relay R4 (Fig. 15*d*) to become energized, whereupon at 9-time an impulse is transmitted through secondary cam contacts S1 (Fig. 15*a*) and relay contacts R4-2, to secondary station brush hub 232.

SUMMARY

Primary and secondary record cards are moved singly, by primary and secondary card feeding mechanisms, from their respective hoppers, past their respective sensing stations, to the card distributing apparatus which includes stacker pockets SP1 to SP4 (Fig. 1). As a card is fed past a sensing station, the information on the card is entered into a data storing device associated therewith, and a data comparing device also associated with the sensing station.

The data comparing device shown in Figs. 9 and 10 includes a pair of electromagnet controlled, cam operated switches which are connected to three lines for respectively indicating a relatively high, low or equal magnitude between two groups of data.

The cyclically operating data storing device shown in Fig. 3 is comprised of a continuously rotating wheel assembly having radially arranged and radially movable slugs 116 (Figs. 4 and 5) supported thereon, each of which has a latched and an unlatched position, a data readout commutator for engaging unlatched slugs, and a data read-in mechanism for unlatching latched slugs. As the wheel assembly moves past the data read-in mechanism, selected ones of the latched slugs are unlatched so as to represent corresponding holes in the record card sensed.

In the machine cycle during which the record card is analyzed, and the information thereon is entered into the data storing device, special character tests are made in order to determine not only the presence of any special characters but the relative magnitude of the same as well.

As the wheel assembly is rotated, the contact slugs are moved successively past a camming commutator member 125 (Fig. 5) whereby each unlatched slug is latched. Hence, the data carried by the wheel assembly in the form of unlatched slugs is cleared automatically from the data storing device.

In view of the foregoing, and since the card feeding mechanism associated with the data storing device is inoperative during selectively controlled machine cycles, provision is made to re-enter data into the storing device for additional storage. Accordingly, the data entered into the storing device during a card feed machine cycle is re-entered so as to unlatch slugs which represent the data sensed by the sensing station.

Concurrently with the re-entry of data into the storing device through the aforementioned recirculation circuit, similar data is entered into the data comparing device. Hence, the information carried on a record card is entered during a card feed machine cycle from the card sensing station into the data storing device and the data comparing device, and is re-entered or recirculated, during a non-card machine cycle, into the data storing device and the data comparing device from the readout commutator of the data storing device.

While there have been shown and described and pointed out the fundamental novel features of the invention as applied to a preferred embodiment, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. A data receiving and storing device comprising a carrier having a plurality of radially arranged elements thereon, each of which has a latched and an unlatched position, an electromagnet having a movable part for releasing said elements from latched to unlatched position, means for moving said carrier so as to present said elements to said electromagnet one by one, means for transmitting to said electromagnet a data representing signal whereby said electromagnet is energizd to release the element adjacent thereto, means including an electrical connector for engaging unlatched elements to provide an output terminal, and means for connecting said connector to the electromagnet for transmitting from said electrical connector to said electromagnet a signal corresponding to the data representing signal when the unlatched element engages said electrical connector after a predetermined extent of movement of said carrier.

2. A cyclically operable data receiving and storing device comprising a carrier having a plurality of radially arranged elements thereon, each of which has a latched and an unlatched position, means for retaining said element in said latched position, input means including an electromagnet having a movable part effective to activate the retaining means for releasing said elements from latched to unlatched position, output means including an electrical connector for engaging unlatched elements to provide an output signal, means for moving said carrier whereby said elements are advanced past said electromagnet and said electrical connector, means for transmitting to said input means during a machine cycle a timed data representing signal whereupon said electromagnet is energized to unlatched one of said elements so that the unlatched element is indicative of the timed data representing signal, and means including a circuit external of the device for transmitting from said output means to said input means during a following machine cycle a correspondingly timed data representing signal when the unlatched element engages said electrical connector.

3. A cyclically operable data storing device comprising a rotatable carrier having a series of radially arranged elements supported thereon, each of which has an active and an inactive position, means normally retaining the elements in the inactive position, a setting member for effecting operation of said means to cause said elements to shift from inactive to active position, first means for rotating the carrier so as to present said elements to said setting member one by one, second means for causing said setting member to effect operation of the retaining means to shift the adjacent element to an active position, commutator means for engaging after a predetermined extent of rotation said carrier elements shifted to an active position, and third means for so connecting said second means and said commutator means externally of the device so that said setting member is caused to engage and move the adjacent element to an active position when said commutator means engages the active element.

4. A device as claimed in claim 3 wherein said commutator means includes a resetting component for shifting said elements from active to inactive position prior to the presentation of said elements to said setting member.

5. A data receiving and storing apparatus comprising a delay device having a plurality of data representing elements supported thereon, each of which has an active and an inactive position, data input means including an electromagnet and a movable member operated thereby for causing said elements to shift from inactive to active position, means for moving said delay device so as to present said elements to said electromagnet and said movable member one by one, a signal data output means including an electrical contactor for engaging active elements, a signal data source, a first electric network for connecting said signal data source to said data input means whereby said electromagnet is energized causing its movable member to shift the element adjacent thereto to an active position for each data representing signal, a second electric network for connecting said data output means to said data input means when said electrical contactor engages said active element, and electrical means connected to be selectively operable for disabling said first network during the operation of said second network.

6. A cyclically operable data storing apparatus comprising a delay device having a plurality of data representing elements supported thereon, each of which has an active and an inactive position, releasable means for maintaining each element in its inactive position, a signal data source, data input means including an electromagnet for releasing said releasable means to release said elements from inactive to active position, means for moving said delay device so as to present said elements to said electromagnet one by one, a data output means including a contactor for engaging an active element after a predetermined extent of movement of said delay device, a first electric network including switching contacts for connecting during a machine cycle said data source to said input means whereby said electromagnet is energized in response to a data representing signal to release said releasable means to release the element adjacent to said electromagnet, a second electric network including switching contacts for connecting externally of the device during the following machine cycle said output means to said input means when said contactor engages an active element, and electrical means governing said switching contacts for controlling said networks so that one network is disabled during the operation of the other network.

7. In a cyclically operable record card controlled machine having means for sensing the data designations on a record card and means for feeding record cards sequentially past said sensing means, the combination of a data delay device having an input and an associated output, a first electric network including switching contacts for connecting said sensing means to said delay device input, a second electric network including switching contacts for connecting said delay device output and input, and electrical means governing said switching contacts for controlling said networks whereby said first electric network is disabled for the machine cycles during which the operation of said card feeding means is disabled.

8. In a data storing device in a record card controlled machine having card sensing means and card feeding means for moving data bearing record cards past said sensing means; the combination of a data carrier having a plurality of activatable data storing means, data read-in means operable to effect selective activation of said storing means, data readout means including an element activated by an activated storing means, means for causing a relative movement between said carrier and said element of the readout means in synchronization with said card feeding means, means for transmitting a data representing signal to said read-in means from said sensing means so as to activate a data storing means, and circuit means for connecting said readout means to said read-in means after a predetermined extent of relative movement between said carrier and said readout means so as to transmit the signal from said readout means to said read-in means for recirculation.

9. In a data staring device in a cyclically operable record card controlled machine having means for sensing the data designations on a record card and means for feeding record cards past said sensing means, the combination of a movable data carrier operable in synchronization with the feeding means and having activatable data storing means, data storing device input means, data storing device output means operable under the control of activated storing means, means for moving the data storing means of said carrier past said input means and said output means, a first electric network for connecting said sensing means to said input means whereby a select one of said data storing means of said carrier is activated under control of said sensing means, a second electric network for connecting said output means to said input means externally of the carrier whereby select data storing means of said carrier are activated under control of said output means and said storing means, said storing means being removed at this time from under the control of the means for sensing, means for deactivating all activated storing means on the portions of said carrier moving past said output means prior to moving said portions past said input means, electrical means connected to govern the networks whereby one network is disabled during the operation of the other network, and machine governed means controlling said preceding means whereby said first electric network is disabled for the machine cycles during which the operation of said card feeding means is disabled.

10. In a data storing device in a cyclically operable record card controlled machine having sensing means and means for feeding a record card bearing data designations past said sensing means whereby the latter scan the index point positions of each card, the combination of a data carrier having a series of radially arranged elements supported thereon, each of which has an active and an inactive position, releasable means retaining the elements in an inactive position, a setting member for releasing said elements from inactive to active position, means for rotating said carrier so as to present one of said elements to said setting member every index point, electrical means controlled during a machine cycle by said sensing means for causing said setting member to effect operation of the releasable means to release the adjacent element to an active position which is indicative of a sensed data designation, commutator means for engaging after a predetermined extent of rotation the carrier element shifted to an active position, and means selectively effective during a next following machine cycle for connecting said commutator means, the released element, and said electrical means so as to cause said setting member to release the element adjacent thereto to an active position which is indicative of the sensed data designation.

11. In a machine of the class described having means for sensing the data designations on a record card and means for feeding record cards past said sensing means, the combination of a data storage device comprising a cyclically operable data carrier having means thereon activatable to carry data, data input means for activating the activatable means, data output means, a relay having normally open and normally closed contacts, a first electric circuit including said normally closed contacts for connecting said sensing means to said input means to activate the data carrier means so that data is impressed for storage upon said carrier under control of said sensing means, a second electric circuit under the control of an activated activatable means including said normally open contacts for connecting said output means to said input means to activate another activatable means, whereby said data already stored is impressed for a second time upon said carrier after a predetermined machine delay, means for moving said carrier past said input means and said output means, means for deactivating all activated activatable means thereon for clearing the portions of said carrier having stored data thereon and moving past said output means prior to moving said portions past said input means, means for controlling said record card feeding means in accordance with data from said output means, and machine controlled means for controlling said relay so that said relay is energized only during the time said feeding means is disabled in order to recirculate stored data from said output means to said input means.

12. In a machine of the class described having means for sensing the data designations on a record card and means controlled by an electromagnet for feeding record cards past said sensing means, the combination of a data storage device comprising a cyclically operable data carrier having means capable of being selectively activated to store data, data input means operable to activate said data storing means, data output means controlled by activated means of the carrier, a relay having normally open and normally closed contacts, a first electric circuit including one of said contacts for connecting said sensing means to said input means so that said input means will be operable to activate said data storing means so that an indication of the sensed data is impressed for storage upon said carrier under control of said sensing means, a second electric circuit including the other one of said contacts for connecting said output means to effect operation of said input means to activate other data storing means whereby said stored data is impressed again for storage upon said carrier under the control of said activated data storing means instead of under the control of the means for sensing after a predetermined machine delay, means for moving said activatable means of the carrier past said input means and said output means, means for acting on the activated data storing means to deactivate them and clearing the portions of said carrier whereon said data is stored and moving past said output means prior to moving said portions past said input means, and machine controlled electric means for controlling concurrently said relay and said electromagnet so that data already stored on said carrier is recirculated from said output means to said input means for additional storage for the time said feeding means is disabled.

13. A machine of the class described comprising means for sensing primary and secondary cards, means for feeding primary cards past said primary sensing means and secondary cards past said secondary sensing means, first storage means having activatable data input means connected to be activated by the primary sensing means for storing data designations carried on a primary card during the machine cycle as the primary card is fed past its sensing means and having data output means controlled by the stored data designations, second storage means having activatable data input means connected to be activated by the secondary sensing means for storing data designations carried on a secondary card during the machine cycle as the secondary card is fed past its sensing means and having data output means controlled by said secondary stored data designations, means connected to said data output means of said first and said second means jointly under the control of the primary and secondary sensing means and data output means for comparing the data designations of a primary card with the data designations of a secondary card, a plurality of magnets to control said card feeding means, means controlled by said comparing means to selectively control said magnets so as to disable either said primary or said secondary feeding means, and electrical means for connecting said output means and said input means of said secondary storing means during the machine cycle said secondary feeding means is disabled, and said output and said input means of said primary storing means during the machine cycle said primary feeding means is disabled, so that the data stored in the corresponding storage means is re-entered for additional storage.

14. In a machine for comparing primary and secondary data for relative magnitude, wherein comparison of the two groups of data is effected by an electrical comparison signal; a first data storage device having input and output means for storing indications which correspond to primary data, said indications controlling the output means; a second data storage device having input and output means for storing indications which correspond to secondary data, said indications controlling the secondary output means; primary data supplying means; secondary data supplying means; a first electric network for connecting said primary data supplying means to said primary input means whereby the primary data is entered for storage in said first storage device; a second electric network for connecting said secondary data supplying means to said secondary input means whereby the secondary data is entered for storage in said second storage device; a third electric network for connecting said primary output means to said primary input means whereby said data already stored in said first storage device is re-entered for additional storage; a fourth electric network for connecting said secondary output means to said secondary input means whereby said data already stored in said second storage device is re-entered for additional storage; data comparing means controlled in accordance with data stored in said storage devices by said primary and secondary data supplying means; a pair of settable switches controlled by said data comparing means; circuit means including said switches having three lines for respectively indicating the equality between the primary and secondary data, the superiority and the inferiority of said primary data with respect to said secondary data; said circuit means including means for transmitting the comparison signal to said equality line when said switches are normal, to said superiority line when one of said pair of switches is set, and to said inferiority line when the other one of said pair of switches is set; and means controlled by the comparison signal for controlling said networks whereby the comparison signal to said equality line causes the disablement of said third and fourth networks and the operation of said first and second networks, the comparison signal to said superiority line causes the disablement of said first and fourth networks and the operation of said second and third networks, and the comparison signal to said inferiority line causes the disablement of said second and third networks and the operation of said first and fourth networks.

References Cited in the file of this patent

UNITED STATES PATENTS

| | | |
|---|---|---|
| 2,172,067 | Mills | Sept. 5, 1939 |
| 2,408,715 | Wilkerson | Oct. 1, 1946 |
| 2,536,915 | Dayger et al. | Jan. 2, 1951 |